(12) United States Patent
Makino et al.

(10) Patent No.: US 10,274,219 B2
(45) Date of Patent: Apr. 30, 2019

(54) INDOOR UNIT FOR AIR-CONDITIONING APPARATUS

(71) Applicant: Mitsubishi Electric Corporation, Tokyo (JP)

(72) Inventors: Hiroaki Makino, Tokyo (JP); Kouji Yamaguchi, Tokyo (JP); Tetsuya Tazawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 135 days.

(21) Appl. No.: 15/536,207

(22) PCT Filed: Mar. 25, 2016

(86) PCT No.: PCT/JP2016/059560
§ 371 (c)(1),
(2) Date: Jun. 15, 2017

(87) PCT Pub. No.: WO2016/153021
PCT Pub. Date: Sep. 29, 2016

(65) Prior Publication Data
US 2017/0370605 A1 Dec. 28, 2017

(30) Foreign Application Priority Data
Mar. 26, 2015 (WO) .................. PCT/JP2015/001749

(51) Int. Cl.
*F24F 11/36* (2018.01)
*F24F 11/77* (2018.01)
(Continued)

(52) U.S. Cl.
CPC ............ *F24F 11/77* (2018.01); *F24F 1/0007* (2013.01); *F24F 11/30* (2018.01); *F24F 11/36* (2018.01);
(Continued)

(58) Field of Classification Search
CPC .. F24F 11/30; F24F 11/36; F24F 11/77; F24F 11/89; F24F 13/20; F24F 1/0007; F24F 2001/0081; F24F 2110/50; F24F 2140/20
(Continued)

(56) References Cited

U.S. PATENT DOCUMENTS 5,664,428 A * 9/1997 Sugiyama ............. F24F 1/0007
62/259.1
2002/0020183 A1 * 2/2002 Hayashi ............... B60H 1/3229
62/298
(Continued)

FOREIGN PATENT DOCUMENTS

JP 04-369370 A 12/1992
JP 08-327195 A 12/1996
(Continued)

OTHER PUBLICATIONS

International Search Report of the International Searching Authority dated Jun. 14, 2016 for the corresponding international application No. PCT/JP2016/059560 (and English translation).

*Primary Examiner* — Henry T Crenshaw
(74) *Attorney, Agent, or Firm* — Posz Law Group, PLC

(57) ABSTRACT

When a controller determines that a leakage of refrigerant occurs, the controller executes a control of rotating an air-sending fan at high rotation speed. After the control, the controller executes a control of stopping rotation of the air-sending fan or reducing a rotation speed of the air-sending fan in accordance with a result of detection by a first refrigerant sensor provided in a lower portion of a heat exchanger chamber. Thus, the air-sending fan is prevented from continuing the rotation at high rotation speed. Therefore, an indoor unit for an air-conditioning apparatus is excellent in safety and is capable of avoiding feeling of discomfort of a user due to the high-speed rotation of the air-sending fan.

7 Claims, 19 Drawing Sheets

(51) Int. Cl.
*F24F 11/89* (2018.01)
*F24F 13/20* (2006.01)
*F24F 11/30* (2018.01)
*F24F 1/0007* (2019.01)
*F24F 110/50* (2018.01)
*F24F 140/20* (2018.01)
*F24F 1/00* (2019.01)

(52) U.S. Cl.
CPC .............. *F24F 11/89* (2018.01); *F24F 13/20* (2013.01); *F24F 2001/0081* (2013.01); *F24F 2110/50* (2018.01); *F24F 2140/20* (2018.01)

(58) Field of Classification Search
USPC .......................................................... 62/126
See application file for complete search history.

(56) References Cited

U.S. PATENT DOCUMENTS

| | | | | |
|---|---|---|---|---|
| 2002/0178738 | A1* | 12/2002 | Taira | F25B 49/005 62/129 |
| 2007/0156373 | A1* | 7/2007 | Yamashita | F25B 49/005 702/182 |
| 2013/0174592 | A1 | 7/2013 | Yamashita et al. | |
| 2016/0091241 | A1* | 3/2016 | Suzuki | F25B 49/005 62/186 |
| 2016/0109162 | A1* | 4/2016 | Suzuki | F24F 13/20 62/498 |
| 2016/0245566 | A1* | 8/2016 | Hiraki | F25B 49/005 |
| 2016/0348933 | A1* | 12/2016 | Takeuchi | F24F 1/50 |
| 2017/0370605 | A1* | 12/2017 | Makino | F24F 11/89 |

FOREIGN PATENT DOCUMENTS

| | | |
|---|---|---|
| JP | 2000-081258 A | 3/2000 |
| JP | 2002-098346 A | 4/2002 |
| JP | 2002-147981 A | 5/2002 |
| JP | 2014-224612 A | 12/2014 |
| WO | 2012/049710 A1 | 4/2012 |
| WO | 2013/038599 A1 | 3/2013 |

* cited by examiner

INDOOR UNIT FOR AIR-CONDITIONING APPARATUS

CROSS REFERENCE TO RELATED APPLICATIONS

This application is a U.S. national stage application of International Application No. PCT/JP2016/059560, filed on Mar. 25, 2016, and is based on International Application No. PCT/JP2015/001749 filed on Mar. 26, 2015, the contents of which are incorporated herein by reference.

TECHNICAL FIELD

The present invention relates to an indoor unit for an air-conditioning apparatus which uses refrigerant having flammability in a refrigerant circuit.

BACKGROUND

Hitherto, in an air-conditioning apparatus, R410A being an HFC refrigerant has been mainly used as refrigerant to be filled into a refrigerant circuit. R410A has zero ozone depletion potential ODP, and hence does not cause depletion of the ozone layer. However, R410A has a property with a high global warming potential GWP. Therefore, in the aim of preventing the global warming, there has been an increasing shift from the HFC refrigerant having a high GWP such as R410A to an HFC refrigerant having a low GWP.

As such an HFC refrigerant having a low GWP, there is known, for example, halogenated hydrocarbon having a carbon double bond in composition. As representative examples, there are known HFO-1234yf (CF3CF=CH2; tetrafluoropropane), HFO-1234ze (CF3-CH=CHF), and HFO-1123 (CF2=CHF). Those are kinds of the HFC refrigerant. However, unsaturated hydrocarbon having a carbon double bond is called "olefin", and hence those refrigerants are often expressed as HFO, with the initial letter "O" of olefin. Thus, those refrigerants are herein referred to as HFO refrigerants so as to be distinguished from the HFC refrigerants having no carbon double bond in composition such as R32 (CH2F2; difluoromethane) and R125 (CHF2-CF3; pentafluoroethane) forming R410A.

Such HFO refrigerant having a low GWP may be used in a form of a single-component refrigerant or in a form of a refrigerant mixture being a mixture with another HFO refrigerant. It is highly probable that the HFO refrigerant having a low GWP is used in a form of a refrigerant mixture with the HFC refrigerant as represented by R32. The HFO refrigerants or the refrigerant mixtures of the HFO refrigerant and the HFC refrigerant are not as highly flammable as an HC refrigerant such as R290 (C3H8; propane), but have mild flammability and are different from R410A being non-flammable. Therefore, caution needs to be taken with respect to a leakage of refrigerant. The refrigerant having flammability ranging from mild flammability to high flammability is hereinafter referred to as "flammable refrigerant". R32 in a form of a single-component refrigerant has mild flammability like the HFO refrigerant. That is, R32 in a form of a single-component refrigerant is flammable refrigerant. Therefore, the refrigerant mixture of the HFO refrigerant and R32 is also the flammable refrigerant. R410A obtained by mixing R125 into R32 is non-flammable because of the property of R125.

When such flammable refrigerant leaks into an indoor space, and the leaked refrigerant stagnates without being diffused, there is a possibility of causing formation of a gas atmosphere having a flammable concentration. When any ignition source is present in the gas atmosphere having the flammable concentration, the refrigerant may catch fire. To avoid occurrence of such a situation of causing the leaked refrigerant to catch fire in the indoor space, it is necessary that the air-conditioning apparatus which uses the flammable refrigerant in the refrigerant circuit detect the leakage of refrigerant.

Hitherto, there has been proposed the following detection unit configured to detect the leakage of refrigerant in the air-conditioning apparatus. A temperature sensor is arranged at a position in the refrigerant circuit where liquid refrigerant may stagnate, for example, below a header of an indoor unit-side heat exchanger or at a liquid reservoir such as a receiver. When a refrigerant temperature detected by the temperature sensor falls at a rate exceeding a predetermined rate, a control unit determines that a leakage of refrigerant occurs (for example, see Patent Literature 1).

Further, there has been proposed the following air-conditioning apparatus. When a leakage of refrigerant is detected, an air-sending fan of an indoor unit is rotated to diffuse the leaked refrigerant in the indoor space, thereby preventing stagnation of the leaked refrigerant in the indoor unit or around the indoor unit. The working of air-sending of the air-sending fan causes diffusion of the leaked refrigerant, thereby preventing formation of a gas atmosphere of the leaked refrigerant gas having a flammable concentration (for example, see Patent Literature 2).

PATENT LITERATURE

Patent Literature 1: Japanese Unexamined Patent Application Publication No. 2000-081258 (paragraphs [0052] to [0071] and FIGS. 1 to 4)

Patent Literature 2: Japanese Unexamined Patent Application Publication No. 2002-098346 (paragraphs [0019] to [0021])

With the detection unit configured to detect a leakage of refrigerant as disclosed in Patent Literature 1, the temperature sensor detects a surface temperature of the liquid refrigerant reservoir in the refrigerant circuit as a refrigerant temperature, and the presence or absence of the leakage of refrigerant is determined based on a change rate of the detected temperature. Therefore, as described in paragraph [0065] of Patent Literature 1, there is a problem in that the control unit takes time to determine the presence of the leakage of refrigerant after occurrence of the leakage of refrigerant.

According to the description in paragraph [0065] of Patent Literature 1, the detection unit configured to detect the leakage of refrigerant in the air-conditioning apparatus of Patent Literature 1 uses, as a reference, the measurement graph of FIG. 4 for showing a temperature change at the time of leakage of refrigerant (experiment result), and determines that the leakage of refrigerant has occurred when the detected temperature obtained by the temperature sensor shows any one of the following two change phenomena.

(a) As shown in the former half of the graph (period from the start of leakage to the elapse of 20 minutes), a gentle fall of temperature at 0.5 degrees Celsius per minute has occurred for a predetermined time period (for example, a time period of from 10 minutes to 20 minutes).

(b) As shown in the latter half of the graph (period after the elapse of 40 minutes), the abrupt temperature fall of 5 degrees Celsius per minute has occurred.

As described above, the surface temperature of the component of the refrigerant circuit is regarded as the refrigerant temperature to determine the change rate. As a result, the temperature change is mild in the former half from the start of leakage to the elapse of 20 minutes, and the abrupt temperature change occurs after the elapse of 40 minutes. Therefore, even when the leakage of refrigerant is to be detected in accordance with the above-mentioned criterion (a), it takes at least 10 minutes.

Further, during operation of the air-conditioning apparatus in which a compressor of the refrigerant circuit operates to circulate the refrigerant in the circuit, and during a time period immediately after activation, the refrigerant temperature (component surface temperature) at a portion in the refrigerant circuit where the liquid refrigerant may stagnate is often changed due to evaporation of the liquid refrigerant stagnating there. Therefore, when the leakage of refrigerant is to be detected based on the above-mentioned criterion (a) which involves the mild temperature change rate for determination, erroneous detection might be caused. Specifically, even though the temperature change is caused by a working of normal operation of the air-conditioning apparatus, and the leakage of refrigerant does not occur, it may be erroneously determined that a leakage of refrigerant occurs.

To shorten the time period taken by the controller to determine occurrence of the leakage of refrigerant, it is conceivable to shorten, to be less than 10 minutes, the predetermined time period of the above-mentioned criterion (a) that involves continuation of the gentle fall of temperature. However, as the predetermined time period is shortened, the risk of erroneous detection may increase. Specifically, even though the temperature change is caused by the working of the normal operation as described above, it may be erroneously determined that the leakage of refrigerant occurs.

Meanwhile, the abrupt temperature change as in the above-mentioned criterion (b) occurs less often by the working of the normal operation of the air-conditioning apparatus. When the determination of the leakage of refrigerant is made based on such temperature change, the erroneous detection is less liable to occur. However, as described above, such abrupt temperature change occurs after the elapse of 40 minutes or more from the start of leakage of refrigerant. Therefore, the determination based on the above-mentioned criterion (b) has a problem in that the leakage of refrigerant cannot be detected in an early stage.

Further, according to the indoor unit disclosed in Patent Literature 2, when the leakage of refrigerant is detected, the controller controls the air-sending fan to rotate to diffuse the leaked refrigerant. However, although there is no description in Patent Literature 2, it is preferred that, when the air-conditioning apparatus detects the leakage of refrigerant during operation, the operation of the compressor of the refrigerant circuit be stopped to stop the operation of the refrigeration cycle. Further, the rotation of the air-sending fan is performed at high rotation speed as in a strong wind mode involving a large air-sending amount so as to promote the diffusion of the leaked refrigerant. The air-sending fan continues the rotation at high rotation speed without being stopped. The rotation of the air-sending fan at high rotation speed may be hereinafter referred to as high-speed rotation of the air-sending fan.

As described above, when the indoor unit for an air-conditioning apparatus detects the leakage of refrigerant, and the controller controls the air-sending fan to rotate in accordance with the detection regardless of an intention of a user, the continuous rotation of the air-sending fan at high rotation speed without being stopped may give a feeling of discomfort to a user in a room. Specifically, during a season in which a heating operation is particularly required, when the refrigeration cycle is not operated as such, the user in the room may feel coldness due to the air-sending operation of the air-sending fan. Further, the user may be bothered by noise caused by the high-speed rotation of the air-sending fan.

Meanwhile, when the controller controls the rotating air-sending fan to stop in a short period of time, the leaked refrigerant might not be sufficiently diffused. Further, when the air-sending fan being rotated in accordance with the detection of the leakage of refrigerant can be stopped by a user through use of a remote controller or other devices, a user who has a feeling of discomfort with respect to the working of air-sending may stop the air-sending fan in a short period of time. In such a case, as in the case described above, the leaked refrigerant might not be sufficiently diffused.

SUMMARY

The present invention has been made to overcome the above-mentioned problems, and has a first object to provide an indoor unit for an air-conditioning apparatus which is excellent in safety and reliability, that is, which is capable of detecting occurrence of leakage of refrigerant in an early stage after leakage of refrigerant, and is capable of preventing erroneous detection of determining occurrence of the leakage of refrigerant even when the leakage of refrigerant does not occur.

Further, the present invention has been made to overcome the above-mentioned problems, and has a second object to provide an indoor unit for an air-conditioning apparatus in which the air-sending fan of the indoor unit, which is rotated at high rotation speed in accordance with the detection of the leakage of refrigerant, does not continue the rotation at high rotation speed, thereby being excellent in safety and being capable of avoiding a feeling of discomfort to a user caused by the high-speed rotation of the air-sending fan.

As a unit for achieving the above-mentioned first object, according to one embodiment of this invention, there is provided an indoor unit for an air-conditioning apparatus, which includes a casing having an air inlet and an air outlet and is to be installed in a room to be air-conditioned, the indoor unit including: an air-sending fan which is configured to generate an air flow from the air inlet to the air outlet; a heat exchanger which forms a part of a refrigeration circuit filled with refrigerant and allows the air flow generated by the air-sending fan to pass through the heat exchanger; a heat exchanger chamber which is formed in the casing and accommodate the air-sending fan and the heat exchanger; a communication pipe which forms a part of the refrigerant circuit and is connected to the heat exchanger; an external connection pipe which forms a part of the refrigerant circuit and is introduced into the room from an outside of the room; a pipe chamber which is formed separately from the heat exchanger chamber in the casing and has a connection portion of the communication pipe and the external connection pipe positioned in the pipe chamber; a temperature sensor which is provided in the pipe chamber and is configured to measure a temperature T of the pipe chamber; and a controller which is configured to determine whether or not a leakage of the refrigerant occurs based on the temperature T of the pipe chamber measured by the temperature sensor.

As a unit for achieving the above-mentioned second object, according to one embodiment of this invention, there is provided an indoor unit for an air-conditioning apparatus, which includes a casing having an air inlet and an air outlet and is to be installed in a room to be air-conditioned, the indoor unit including: an air-sending fan which is configured to generate an air flow from the air inlet to the air outlet; a heat exchanger which forms a part of a refrigerant circuit filled with refrigerant and allows the air flow generated by the air-sending fan to pass through the heat exchanger; a heat exchanger chamber which is formed in the casing, accommodate the air-sending fan and the heat exchanger, and communicates to the air inlet and the air outlet; a first refrigerant sensor which is provided in a lower portion of the heat exchanger chamber and is configured to detect the refrigerant; and a controller which is configured to control operation of the indoor unit for an air-conditioning apparatus, in which, when the controller determines that a leakage of the refrigerant occurs based on a result of detection by the first refrigerant sensor, the controller executes a control of rotating the air-sending fan, and after the execution of the control, the controller executes a control of stopping rotation of the air-sending fan or a control of reducing a rotation speed of the air-sending fan in accordance with a result of detection by the first refrigerant sensor.

According to one embodiment of this invention, the controller can detect a fast leakage of refrigerant in an early stage based on the temperature T of the pipe chamber, which is measured by the temperature sensor provided in the pipe chamber, and erroneous detection can be prevented. Therefore, there can be provided the indoor unit for an air-conditioning apparatus which is excellent in safety and reliability.

Further, according to one embodiment of this invention, when the controller determines that a leakage of refrigerant occurs, the controller executes the control of rotating the air-sending fan. After the execution of the control, the controller executes the control of stopping the rotation of the air-sending fan or reducing a rotation speed in accordance with the result of detection by the first refrigerant sensor provided in the lower portion of the heat exchanger chamber. Therefore, there can be provided the indoor unit for an air-conditioning apparatus which does not continue the rotation of the air-sending fan at high rotation speed, thereby being excellent in safety and being capable of avoiding a feeling of discomfort of a user caused by the high-speed rotation of the air-sending fan.

DETAILED DESCRIPTION

Embodiment 1

Figure 1:
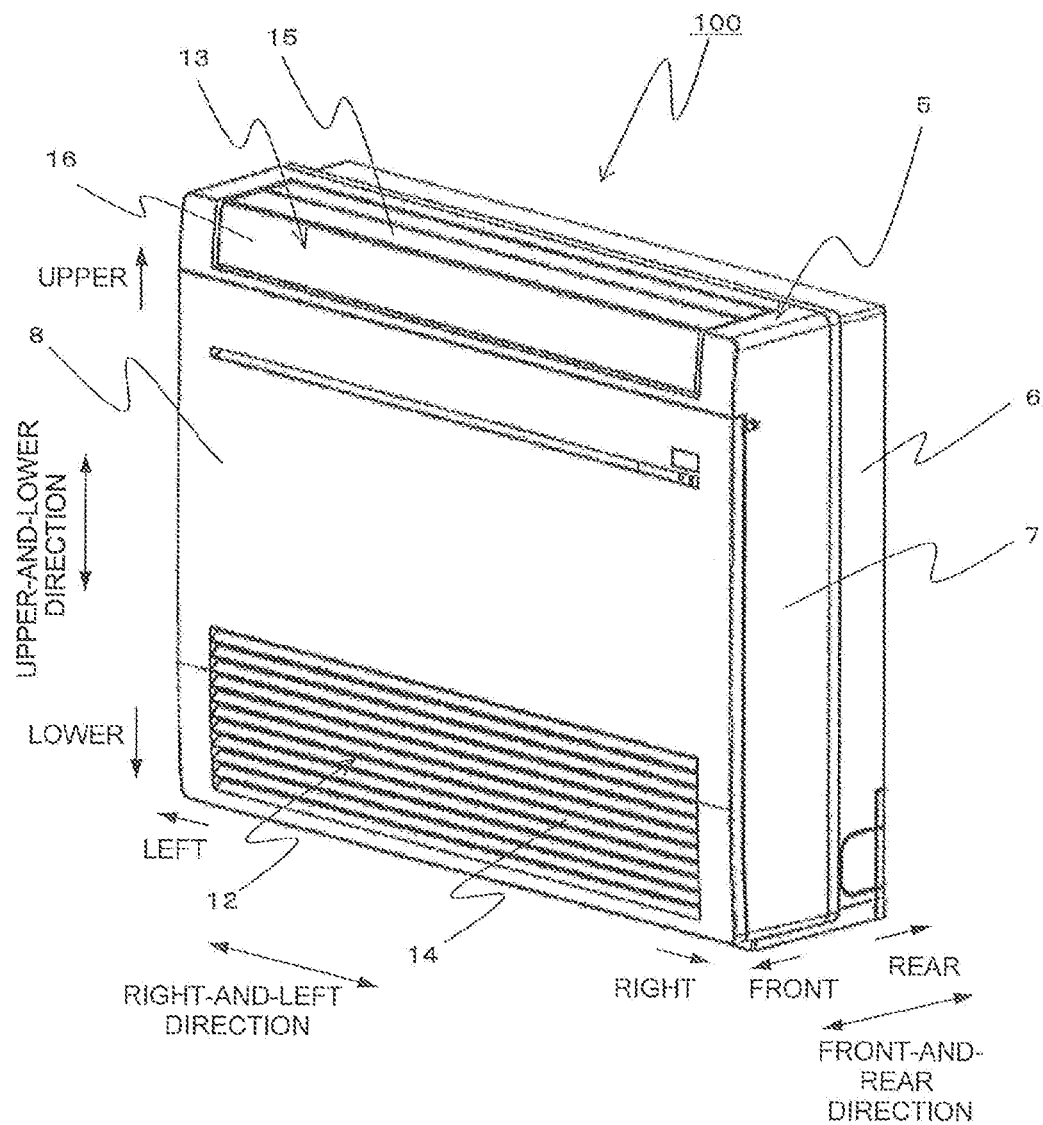
FIG. 1 is an external perspective view of an indoor unit for an air-conditioning apparatus according to Embodiment 1 of this invention.
Figure 2:
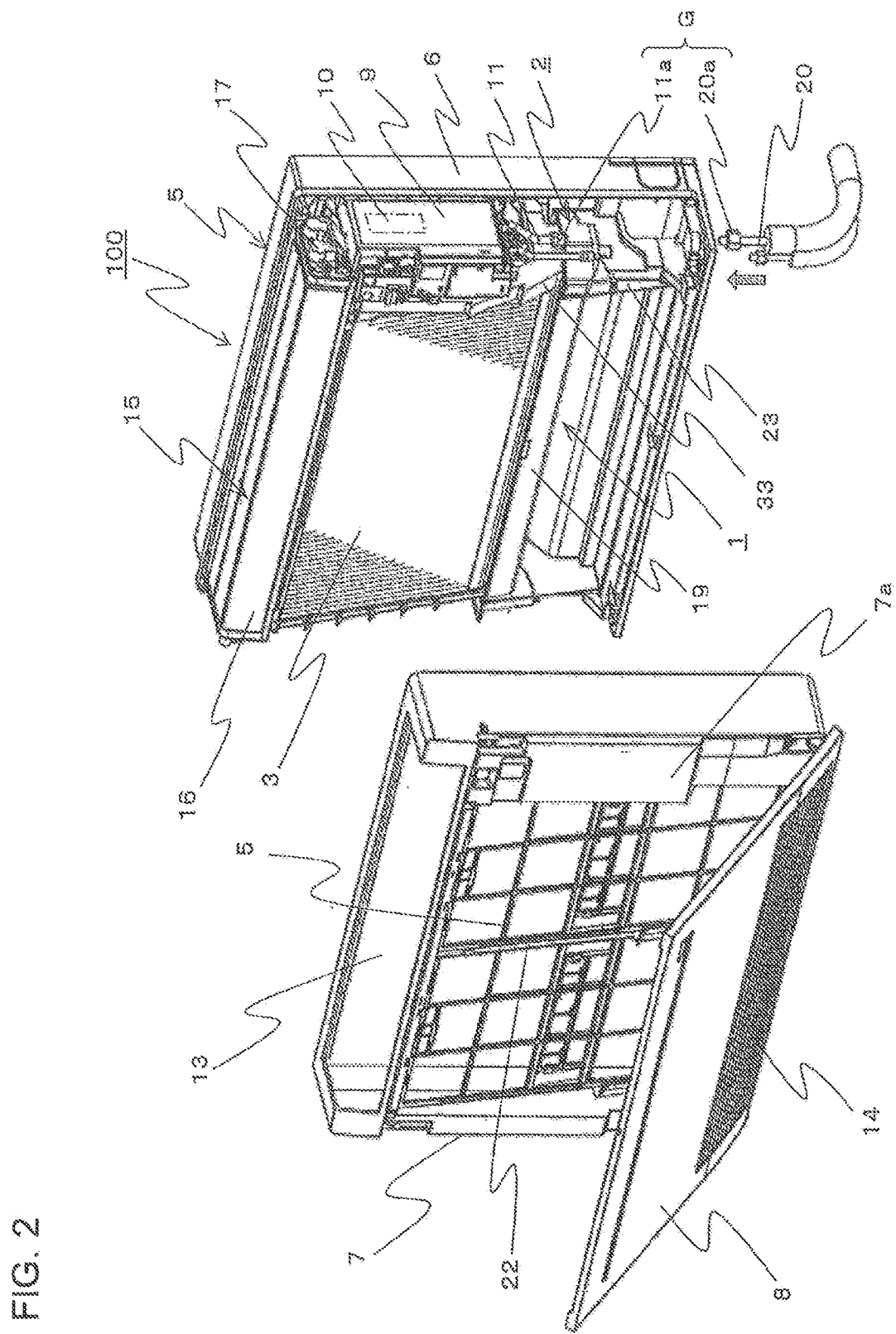
FIG. 2 is an exploded perspective view of the indoor unit for an air-conditioning apparatus illustrated in FIG. 1.
Figure 3:
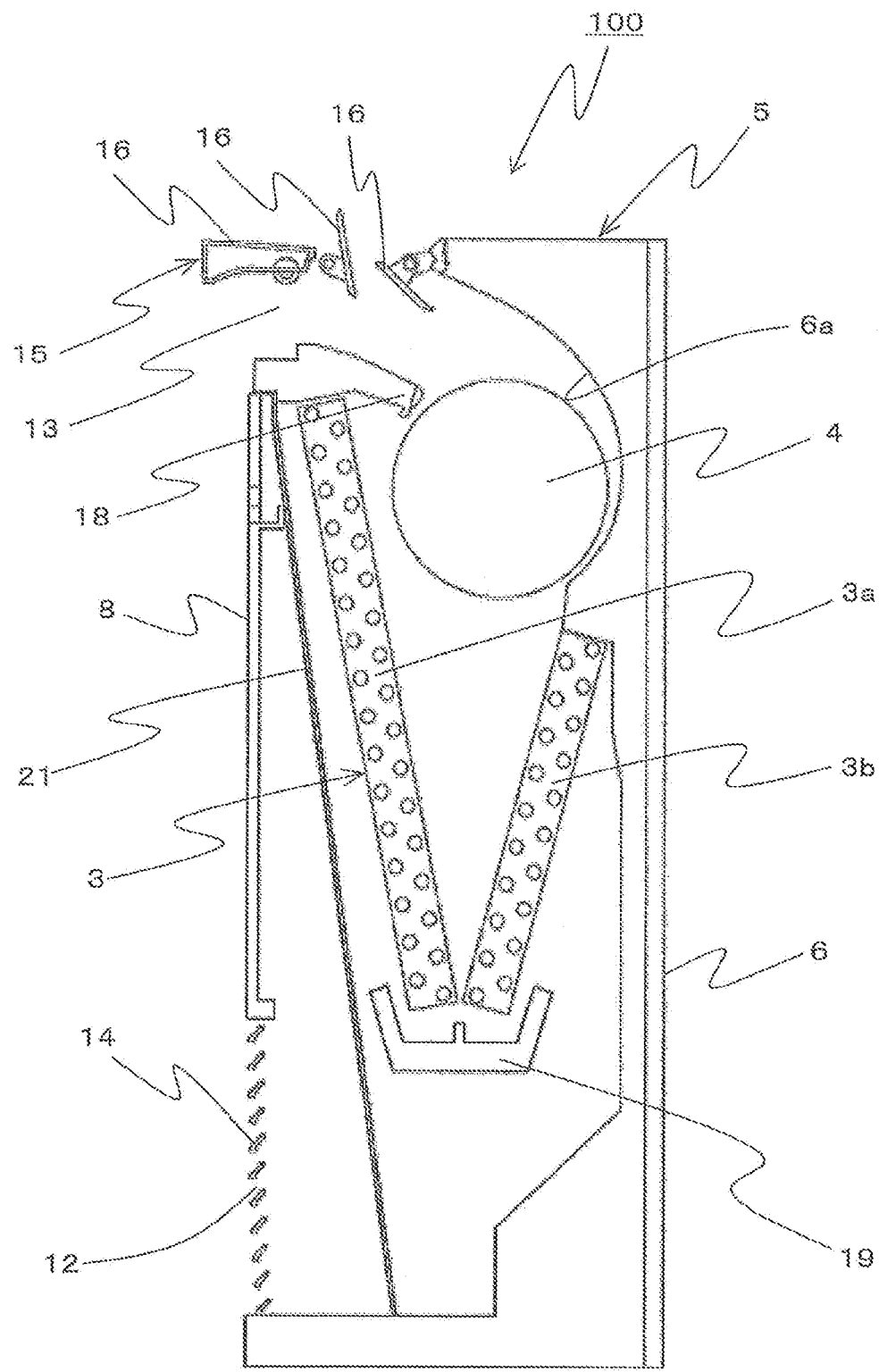
FIG. 3 is a vertical sectional view of the indoor unit for an air-conditioning apparatus illustrated in FIG. 1.

Now, description is made of Embodiment 1 of this invention with reference to the drawings. FIG. 1 is an external perspective view of an indoor unit 100 for an air-conditioning apparatus according to Embodiment 1 of this invention, and FIG. 2 is an exploded perspective view thereof. FIG. 3 is a vertical sectional view of the indoor unit 100 for an air-conditioning apparatus illustrated in FIG. 1, and is a schematic illustration. The indoor unit 100 for an air-conditioning apparatus according to Embodiment 1 is hereinafter simply referred to as "indoor unit 100". The indoor unit 100 constitutes an air-conditioning apparatus with an outdoor unit (not shown) which is to be installed outside.

The indoor unit 100 and the outdoor unit (not shown) are connected to each other via external connection pipes 20 including a liquid pipe and a gas pipe so that a refrigerant circuit filled with refrigerant is formed. During operation of the air-conditioning apparatus, a vapor compression-type refrigeration cycle is operated with the refrigerant circuit. As the refrigerant filled in the refrigerant circuit, a refrigerant mixture is used that is a mixture of HFO-1234yf being a kind of the HFO refrigerant and R32 being a kind of the HFC refrigerant, which are mentioned above. Both the HFO-1234yf and R32 have mild flammability, and the refrigerant mixture is flammable refrigerant.

As illustrated in FIG. 1, the indoor unit 100 has an overall appearance of a rectangular parallelepiped shape. The indoor unit 100 is of a floor-installation type, which is to be placed on a floor surface of a room to be air-conditioned and is mounted and fixed to a wall surface on a rear side. The indoor unit 100 can be mounted and fixed to the wall surface on the rear side under a state in which the indoor unit 100 is arranged above the floor surface with a clearance of about 100 mm, which allows a cleaning implement for cleaning the floor surface to be placed between the floor surface and a lower surface of the indoor unit 100. An installation stand may be arranged on the floor surface, and the indoor unit 100 may be placed on the installation stand.

As illustrated in FIG. 1 to FIG. 3, the indoor unit 100 has a heat exchanger chamber 1 and a pipe chamber 2 in a casing 5 thereof. In the heat exchanger chamber 1 formed on the left side in front view, there are arranged a heat exchanger 3 and an air-sending fan 4 configured to cause indoor air to flow through the heat exchanger 3. The heat exchanger 3 is a component of the refrigerant circuit and allows the refrigerant to flow therethrough during operation of the indoor unit 100.

In an upper portion of the pipe chamber 2 formed on the right side, there is arranged an electrical component unit 9 which accommodate an electric board including a controller 10 configured to control operation of the indoor unit 100. Further, in the pipe chamber 2, there are arranged two communication pipes 11 including a gas pipe and a liquid pipe which are connected to the heat exchanger 3. The communication pipe 11 is also a component of the refrigerant circuit and allows the refrigerant to flow therethrough during operation of the indoor unit 100.

The casing 5 includes a back-side casing 6, a front-side casing 7, and a front surface design panel 8. The back-side casing 6 is arranged on the rear side. The front-side casing 7 is fixed to the front side of the back-side casing 6. The front surface design panel 8 is mounted in an openable and closable manner to the front-side casing 7 so as to cover a front surface opening portion of the front-side casing 7. As illustrated in FIG. 2, the front surface design panel 8 is turnable about a lower end portion thereof being a turning center with respect to the front-side casing 7 in a upper-and-lower direction, and is brought into an open state when the front surface design panel 8 is inclined toward a front side. The front surface design panel 8 may be openable and closable through turning in a left-and-right direction about any one of right and left end portions being a turning center.

In a room to be air-conditioned, the indoor unit 100 is arranged so that the back-side casing 6 is provided on a wall surface side and the front-side casing 7 widely faces an indoor space. During operation, indoor air is sucked through a lower portion of the casing 5, and the sucked indoor air is allowed to pass through the heat exchanger 3. At this time, the indoor air which has exchanged heat with the refrigerant flowing through the heat exchanger 3, that is, conditioned air blows out through an upper portion of the casing 5 to return to the indoor space.

In a lower portion of a front surface of the casing 5, an air inlet 12 is provided that serves as an inlet for the indoor air to be sucked into the casing 5. At the air inlet 12, there is provided a suction grill 14 which is formed integrally with the front surface design panel 8. The suction grill 14 has a plurality of rectangular plates, which are inclined upward from upstream to downstream of the air flow and are arranged at predetermined intervals in the upper-and-lower direction. The intervals of the plurality of rectangular plates serve as passages for the inflow indoor air. The inclination of the rectangular plates causes the inside of the casing 5 to be less visible, thereby preventing the design of the appearance from being impaired.

In a region extending from a front side portion at an upper end of the casing 5 to an upper portion of the front surface of the casing 5, an air outlet 13 is formed that blows out the conditioned air subjected to the heat exchange. The air outlet 13 is formed to open at an upper portion of the front-side casing 7. At the air outlet 13, a blowing unit 15 is provided that includes up-and-down wind direction plates 16, right-and-left wind direction plates (not shown), a drive motor 17, and a stabilizer 18 for the air-sending fan 4. The up-and-down wind direction plates 16 and the right-and-left wind direction plates enable adjustment of directions of the flow of air to be blown. The drive motor 17 is configured to turn the wind direction plates. The blowing unit 15 is fixed to the back-side casing 6. As illustrated in FIG. 1, when the indoor unit 100 is stopped, the air outlet 13 is closed by the up-and-down wind direction plates 16 of the blowing unit 15. As illustrated in FIG. 3, during operation, the up-and-down wind direction plates 16 turn to open the air outlet 13.

The air inlet 12 and the air outlet 13 communicate with the heat exchanger chamber 1. The indoor air which enters the casing 5 through the air inlet 12 passes through the heat exchanger chamber 1 and flows out from the casing 5 through the air outlet 13. The air inlet 12 and the air outlet 13 are open to be apart from each other in the upper-and-lower direction in a portion of the casing 5, which faces the heat exchanger chamber 1.

An air filter 21 is mounted on a front surface side of the front-side casing 7. The air filter 21 is arranged at a position on downstream of the air inlet 12 and upstream of the heat exchanger 3 along the air flow generated by the rotation of the air-sending fan 4. In the front-side casing 7, guide grooves 22 are formed which enable slide movement of the air filter 21, on both right and left sides of the air filter 21. A user can easily remove the air filter 21 from the front-side casing 7 or mount the air filter 21 again to the front-side casing 7 by opening the front surface design panel 8 and sliding the air filter 21 along the guide grooves 22. Therefore, a user can easily clean the air filter 21.

The inside of the casing 5 is partitioned by a partition plate 23 in the right-and-left direction into the heat exchanger chamber 1 and the pipe chamber 2. A plate-like member made of resin, which is formed integrally with the casing 5, serves as the partition plate 23 at a position below the heat exchanger 3. A plate-like member made of metal, which is fixed to a metal side plate of the end surface of the heat exchanger 3 in the right-and-left direction, serves as the partition plate 23 at and above the position of the heat exchanger 3.

Figure 4:
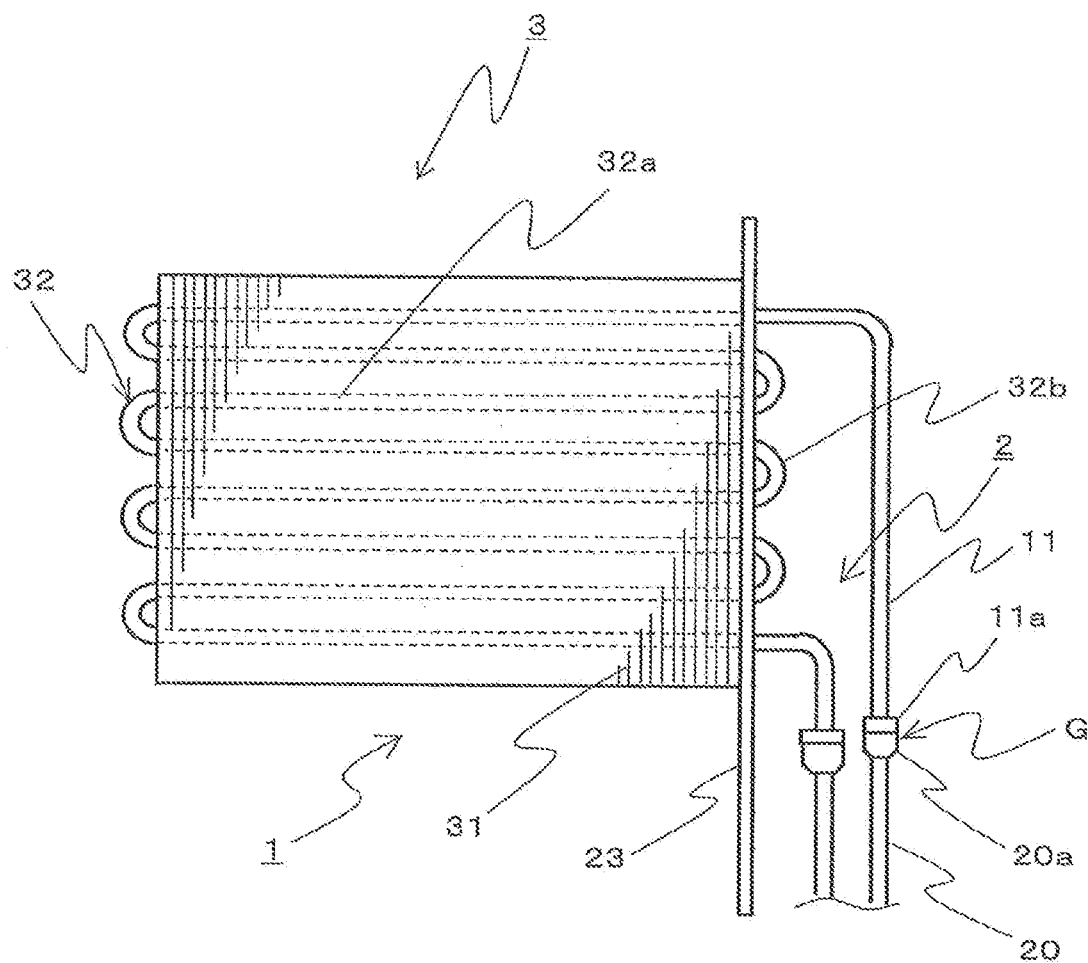
FIG. 4 is a schematic view for illustrating a heat exchanger of the indoor unit for an air-conditioning apparatus illustrated in FIG. 1.

In the heat exchanger chamber 1 formed on the left side of the partition plate 23, there are arranged the heat exchanger 3 and the air-sending fan 4. As illustrated in FIG. 3, the heat exchanger 3 includes a front-side heat exchanger 3a and a back surface-side heat exchanger 3b. The front-side heat exchanger 3a and the back surface-side heat exchanger 3b are constructed to form a V-shape open upward in side view. FIG. 4 is a schematic view for illustrating the heat exchanger 3. The heat exchanger 3 is includes fins 31 and a heat transfer tube 32. The fins 31 are a plurality of elongated thin metal plates arrayed parallel to each other in the right-and-left direction. The heat transfer tube 32 made of metal penetrates through the fins 31 in the right-and-left direction and forms a plurality of rows along a longitudinal direction of the fins 31. The fins 31 are made of aluminum, and the heat transfer tube 32 is formed of an oxygen-free copper pipe having high corrosion resistance.

The heat transfer tube 32 is formed of hair-pin tubes 32a and U-bends 32b. Each hair-pin tube 32a forms a U-shape elongated in the right-and-left direction. Each U-bend 32b has a short U-shape and connects an opening of one hair-pin tube 32a to an other opening of another hair-pin tube 32a. The U-bends 32b are brazed to the hair-pin tubes 32a. With this configuration, a series of flow passages for the refrigerant are formed in the heat exchanger 3. During operation of the indoor unit 100, the refrigerant flows through the heat transfer tube 32. External connection pipes 20 each have one end connected to the outdoor unit and the other end connected to the corresponding one of the communication pipes 11, and the communication pipes 11 are connected to both ends of the heat transfer tube 32 by brazing. The U-bends 32b and the communication pipes 11 pass through the partition plate 23 to be provided in the pipe chamber 2.

In the heat exchanger chamber 1, the air-sending fan 4 is provided at a position on downstream of the heat exchanger 3 along the air flow. A cross-flow fan having an elongated cylindrical shape is used as the air-sending fan 4. The air-sending fan 4 is provided behind an upper portion of the front-side heat exchanger 3a in a horizontal posture in which a rotary axis direction matches with the right-and-left direction. In the heat exchanger chamber 1, an air passage is formed which allows air to flow from the air inlet 12 to the air outlet 13 by rotation of the air-sending fan 4. An air outlet side of the air passage is formed of the stabilizer 18 of the blowing unit 15 and a rear guider 6a. The rear guide 6a has a curved surface shape and is formed integrally with a front surface of the back-side casing 6.

In the pipe chamber 2 formed on the right side of the partition plate 23, the communication pipes 11 are guided from the heat exchanger 3 so that distal end portions of the communication pipes 11 are positioned below the electrical component unit 9 provided in an upper portion of the pipe chamber 2. The communication pipes 11 include a gas pipe and a liquid pipe, and are connected to the other ends of the external connection pipes 20 each having one end connected to the outdoor unit (not shown) arranged outside the room and being introduced, from the outside of the room to be air-conditioned into the room, in which the indoor unit 100 is installed. The external connection pipes 20 are also components of the refrigerant circuit, and the refrigerant flows through the external connection pipes 20 during operation of the indoor unit 100.

The communication pipes 11 and the external connection pipes 20 are connected so that the gas pipes are connected to each other and that the liquid pipes are connected to each other. During any of a cooling operation and a heating operation, the gas refrigerant flows through the gas pipe, and the liquid refrigerant or gas-liquid two-phase refrigerant flows through the liquid pipe. The gas refrigerant has a large volume flow rate, and hence the gas pipe has a larger pipe inner diameter. All of the heat exchanger 3, the communication pipes 11, and the external connection pipes 20 form a part of the refrigerant circuit filled with the refrigerant, and hence the refrigerant which circulates in the refrigerant circuit flows therethrough during operation of the indoor unit 100.

As illustrated in FIG. 2, a connection portion G between the communication pipe 11 and the external connection pipe 20 is positioned below the electrical component unit 9 in the upper-and-lower direction in the pipe chamber 2. The pipes are connected to each other by flare connection at the position of the connection portion G. A union of a flare joint (hereinafter referred to as "flare joint union") is fixed by brazing to a connection portion 11a being a distal end of the communication pipe 11. At a connection portion 20a being a distal end of the external connection pipe 20 on the indoor unit 100 side, a flare portion having a trumpet-like shape is formed in an end surface of the pipe, and a flare nut is mounted so as to surround the flare portion.

At the connection portion G between the communication pipe 11 and the external connection pipe 20, a flare joint union of the connection portion 11a and a flare nut of the connection portion 20a are connected to each other through screw connection. In the screw connection, the flare joint union has a male thread, and the flare nut has a female thread. Through the screw connection, the distal end surface of the flare joint union of the connection portion 11a and the inner surface of the pipe flare portion of the connection portion 20a are brought into close contact with each other, thereby sealing the refrigerant in the refrigerant circuit which has a pressure higher than an atmospheric pressure also during non-operation.

The back-side casing 6 may be partially cut out so that the external connection pipes 20 can enter the pipe chamber 2 through any of the back surface, the side surface, and the bottom surface of the pipe chamber 2. Further, when the external connection pipes 20 are to be routed from the left side of the indoor unit 100, the external connection pipe 20 can enter the pipe chamber 2 from the back surface of the pipe chamber 2 through a pipe passage (not shown) formed to recess on a back side of the back-side casing 6. Therefore, in the lower portion of the pipe chamber 2, specifically, below the electrical component unit 9, a space for enabling entry of a part of the external connection pipe 20 is secured in advance.

In the heat exchanger chamber 1, a drain pan 19, which is configured to receive dew condensation water adhering to the heat exchanger 3 during the cooling operation, is positioned below the heat exchanger 3. The drain pan 19 is a container having a groove-like shape and a reverse trapezoidal cross section with an open upper surface. The drain pan 19 is provided so as to have the upper surface opening oriented toward the heat exchanger 3 side and extend in the right-and-left direction. The drain pan 19 receives, at its upper surface opening, the dew condensation water which drips by its own weight along the heat exchanger 3. The condensation water to be drained, which is received by the drain pan 19, is drained to an outside of the room through a drain hose (not shown) connected to the drain pan 19.

The dew condensation water during the cooling operation adheres not only to the fins 31 of the heat exchanger 3 but also to the heat transfer tube 32. Thus, the drain pan 19 also needs to receive the dew condensation water dripping from positions at both right and left ends of the heat exchanger 3 of the heat transfer tube 32. Therefore, the drain pan 19 needs to be opened below the U-shaped turning portions of the hair-pin tubes 32a on the left side and be opened below the U-bends 32b on the right side.

As described above, the U-bends 32b are positioned in the pipe chamber 2. Thus, the right-side end portion of the drain pan 19 needs to enter the pipe chamber 2. Therefore, the partition plate 23 has a cutout portion for allowing the drain pan 19 to pass therethrough. The right-side end portion of the drain pan 19 passes through the cutout portion, that is, passes through the partition plate 23 to enter the pipe chamber 2.

With this configuration, the drain pan 19 is opened also below the U-bends 32b, thereby being capable of receiving the dew condensation water dripping from the U-bends 32b.

As described above, the drain pan 19 is not only provided in the heat exchanger chamber 1 but also partially provided in the pipe chamber 2. Therefore, the heat exchanger chamber 1 and the pipe chamber 2 are not completely isolated by the partition plate 23, and communication of air through the upper surface opening of the drain pan 19 is allowed. As described above, the heat exchanger chamber 1 and the pipe chamber 2 partially communicate with each other so that the communication of air is allowed.

Further, a U-bend cover 33 is provided on a front side of the U-bends 32b of the front-side heat exchanger 3a (see FIG. 2). When the dew condensation water adhering to the U-bend 32b drops, the dew condensation water may come into contact with the U-bend 32b arranged on a lower side to splash. The U-bend cover 33 is configured to receive and guide such splashed dew condensation water to the drain pan 19. The U-bend cover 33 is fixed to some U-bends 32b of the front-side heat exchanger 3a by clips.

A pipe chamber cover 7a configured to cover a front side of the pipe chamber 2 is formed integrally with the front-side casing 7 so that an inside of the pipe chamber 2 is prevented from being exposed when a user opens the front surface design panel 8 so as to clean the air filter 21. The pipe chamber cover 7a covers the front surface side of the electrical component unit 9, the connection portion G between the communication pipe 11 and the external connection pipe 20, and other components. Therefore, those components are prevented from being visually recognized or touched by a user, with the result that safety and design are secured.

Next, description is made of a basic operation of the indoor unit 100. The controller 10 controls operation of the indoor unit 100 based on operation signal from a remote controller operated by a user, detection signals from various sensors, a predetermined program, or other sources. When an instruction to start a cooling operation or a heating operation is given by a user through use of a remote controller, the controller 10 communicates to an outdoor unit to drive the compressor provided in the outdoor unit. Through the driving of the compressor, the refrigerant is caused to circulate in the refrigerant circuit, thereby operating the refrigeration cycle. The compressor is also a component of the refrigerant circuit. Then, as illustrated in FIG. 3, the up-and-down wind direction plates 16 of the blowing unit 15 are turned to open the air outlet 13, which has been closed by the up-and-down wind direction plates 16 during non-operation, and drive the air-sending fan 4 to rotate.

The rotation of the air-sending fan 4 causes the indoor air to be sucked into the casing 5 through the air inlet 12 formed in the lower portion of the casing 5, and the indoor air sequentially passes through the air filter 21 and the heat exchanger 3. Dusts contained in the indoor air are caught by the air filter 21 when the indoor air passes through the air filter 21. Accordingly, the dusts are removed from the indoor air which is guided to the heat exchanger 3 provided on downstream of the air filter 21 in the air flow generated by the air-sending fan 4. Therefore, adhesion of dusts to the heat exchanger 3 is prevented.

When the indoor air passes through the heat exchanger 3, the indoor air exchanges heat with the refrigerant which flows through the heat transfer tube 32 of the heat exchanger 3. During the cooling operation, heat of the indoor air is deprived of by evaporation heat of the refrigerant so that the indoor air is cooled. During the heating operation, condensation heat of the refrigerant is given to the indoor air so that the indoor air is heated. As a result, the indoor air turns into conditioned air in those operations. The air flow which has passed through the heat exchanger 3 to turn into the conditioned air then crosses the air-sending fan 4 being the cross-flow fan, proceeds to downstream of the air-sending fan 4, and is blown out through the air outlet 13 to the indoor space. At that time, a blowing direction of the blown air flow is adjusted by the up-and-down wind direction plates 16 or the right-and-left wind direction plates (not shown) of the blowing unit 15.

Angles of the up-and-down wind direction plates 16 and the right-and-left wind direction plates are set by the controller 10 in accordance with a user's request or a predetermined automatic wind direction adjustment program. Then, the controller 10 executes a control of turning the up-and-down wind direction plates 16 and the right-and-left wind direction plates. Further, the controller 10 similarly controls the rotation speed of the air-sending fan 4 in accordance with a user's request or a predetermined automatic wind speed adjustment program.

The indoor unit 100 has such a basic configuration and a function. As described above, the flammable refrigerant is used as the refrigerant in the refrigerant circuit. A case is given in which a leakage of refrigerant occurs in the indoor unit 100, and as disclosed in Patent Literature 1 of the above-mentioned background art, there may occur a mild leakage, which is so-called slow leakage, like the leakage through a pin hole of the heat transfer tube 32 with a small weight of the leaked refrigerant per unit time (hereinafter referred to as "leakage rate"). In such a case, even when the leaked refrigerant gas which is heavier than air flows out into the indoor space through the air inlet 12 formed in the lower portion of the casing 5 during non-operation of the indoor unit 100, that is, under a state in which the air-sending fan 4 is not rotated, the leaked refrigerant gas is naturally diffused and does not stagnate. Herein, the expression "naturally diffused" means that the refrigerant moves from a high-concentration region to a low-concentration region (hereinafter referred to as "natural diffusion").

During the slow leakage like the leakage through a pin hole, the weight of the leaked refrigerant gas which flows out from the indoor unit 100 to the indoor space per unit time (hereinafter referred to as "indoor outflow rate") is smaller than the weight of the refrigerant which is naturally diffused in the indoor space per unit time (hereinafter referred to as "natural diffusion rate"). Therefore, the leaked refrigerant having flowed out does not stagnate, and hence the possibility of rise in refrigerant gas concentration to the flammable range in the indoor space is low.

Further, during the operation, air in the indoor space is disturbed by the influence of the air flow generated by the air-sending fan 4. The disturbance of the air forcibly diffuses the leaked refrigerant gas. Therefore, the possibility of rise in concentration of the refrigerant gas to the flammable region is low. Accordingly, in such a case of the mild leakage like the leakage through a pin hole of the heat transfer tube 32, the possibility of causing formation of the gas atmosphere having a flammable concentration is low during both non-operation and operation, and hence the leaked refrigerant is less liable to catch fire. Herein, the leakage of refrigerant means that the refrigerant in the refrigerant circuit flows out from the refrigerant circuit.

Accordingly, fire to be caught by the leaked refrigerant is concerned not during the above-mentioned slow leakage but during the fast leakage of refrigerant. The fast leakage of refrigerant may occur, for example, when the flare connection is released at the connection portion G. At the connection portion 20a of the external connection pipe 20, when the size of the flare portion having the trumpet shape formed on the pipe end surface is excessively small, that is, an outer diameter of the trumpet shape of the flare portion is small, or when the flare portion is reduced in thickness due to excessive fastening of the flare nut 2, the pressure of the refrigerant in the refrigerant circuit which is higher than the atmospheric pressure may cause the flare portion of the external connection pipe 20 to be pushed out from the flare nut or to be cut.

In such a case, under a state in which only the flare nut of the connection portion 20a of the external connection pipe 20 is fastened to the flare joint union of the connection portion 11a of the communication pipe 11, the external connection pipe 20 is removed from the connection portion G, that is, the flare connection is released. As a result, the fast leakage of refrigerant, that is, the leakage of refrigerant with a large leakage rate which is incomparable with the leakage through the pin hole of the heat transfer tube 32 may occur. For example, the leakage rate of the leakage of refrigerant through a pin hole is about 0.1 kg/min, whereas the leakage rate of the leakage of refrigerant caused by the release of the flare connection is about 1.25 kg/min which is 10 times or more larger than that of the leakage of refrigerant through a pin hole.

In particular, when such a fast leakage of refrigerant occurs during the non-operation of the indoor unit 100, the pressure in the pipe chamber 2 is raised due to vaporized leaked refrigerant gas. As a result, the leaked refrigerant gas is pushed out to proceed to the heat exchanger chamber 1 through the upper surface opening of the drain pan 19 having the right side end portion extending in the pipe chamber 2 and flow out to the indoor space through the air inlet 12 formed in the lower portion of the casing 5. At this time, when the indoor outflow rate of the leaked refrigerant gas is higher than the natural diffusion rate, the natural diffusion of the leaked refrigerant gas is not dominant over the outflow of the refrigerant. As a result, there is a fear in that the leaked refrigerant gas stagnates around the indoor unit 100 to form the gas atmosphere having the flammable concentration.

The flammable range of the refrigerant gas concentration (to air) is from 6.2 vol % to 12.3 vol % for HFO1234yf and is from 14.4 vol % to 29.3 vol % for R32. Herein, the refrigerant mixture of those is used. Therefore, in accordance with the mixture ratio, the range of flammable concentration has a lower limit larger than 6.2 vol % and an upper limit smaller than 29.3 vol %.

The connection portion G at which the fast leakage of refrigerant may occur due to the release of the flare connection is provided in the pipe chamber 2 as described above. Therefore, in the indoor unit 100, there is provided a temperature sensor 24 serving as a temperature detection unit configured to measure a temperature T of the pipe chamber 2. Herein, a thermistor is used as the temperature sensor 24.

Figure 5:
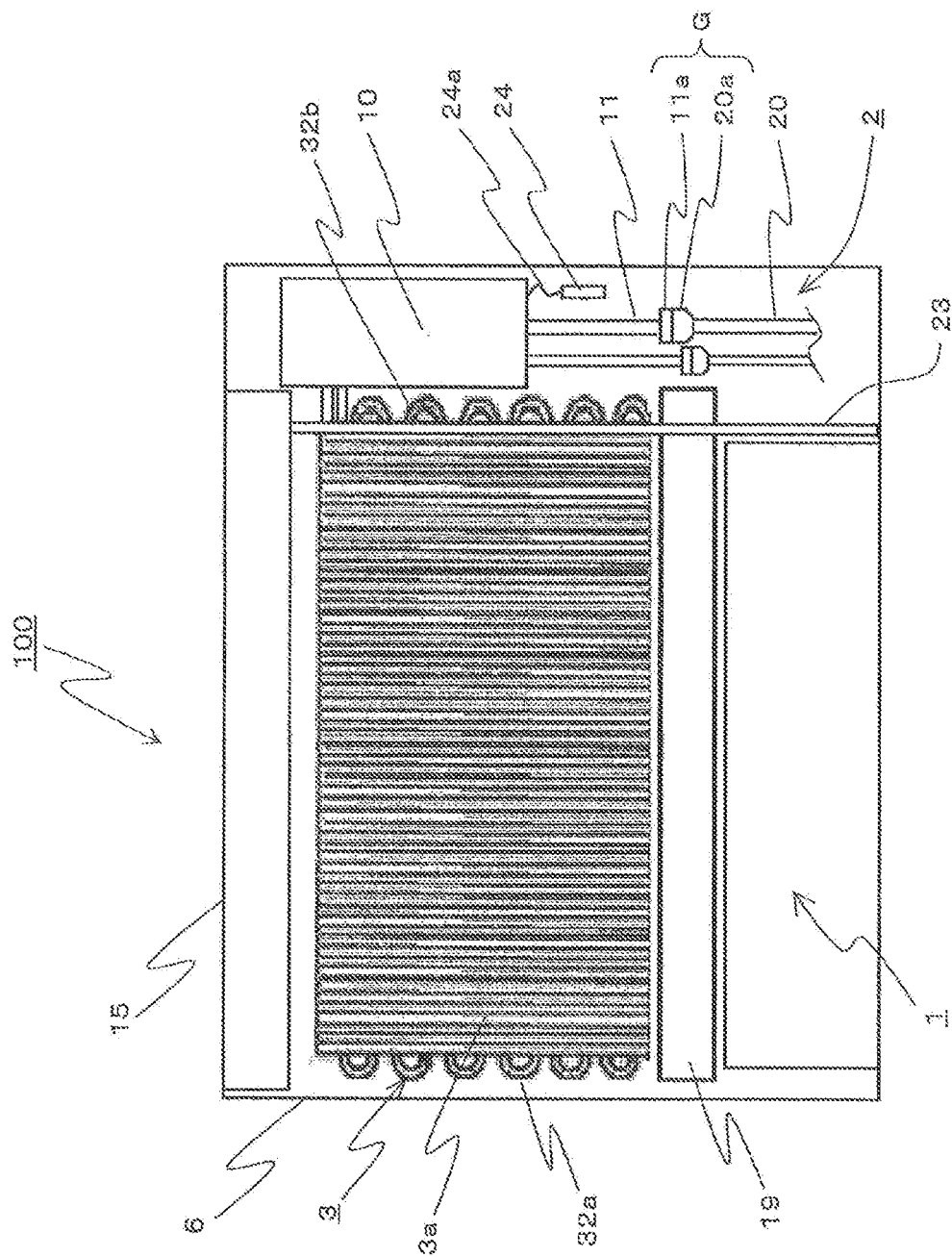
FIG. 5 is a schematic view for illustrating a state in which a front side portion of the indoor unit for an air-conditioning apparatus illustrated in FIG. 1 is removed, as viewed from a front side.

FIG. 5 is a schematic view for illustrating a state in which the front-side casing 7, the air filter 21, the front surface design panel 8, and the U-bend cover 33 of the indoor unit 100 are removed, as viewed from a front side. Herein, the temperature sensor 24 is provided to measure the temperature of the gas atmosphere in the internal space of the pipe chamber 2, and the temperature of the gas atmosphere is regarded as the temperature T of the pipe chamber 2. However, the temperature sensor 24 may be fixed in contact with an inner wall surface of the casing 5, the inner wall surface facing the pipe chamber 2, or may be fixed in contact with a wall surface of the partition plate 23, which faces the pipe chamber 2, below the heat exchanger 3. A surface temperature of the wall surface in contact with the temperature sensor 24 may be detected, and a detection value may be regarded as the temperature T of the pipe chamber 2.

The temperature sensor 24 includes a signal line 24a configured to transmit a detection signal (which is here a current). The signal line 24a is connected to an electric board accommodate in the electrical component unit 9. Thus, the controller 10 grasps a detection value (measurement value) of the temperature sensor 24 via the signal line 24a. That is, the detection value of the temperature sensor 24 is input to the controller 10.

As described above, the indoor unit 100 according to Embodiment 1 has a feature in that the temperature sensor 24 configured to measure the temperature T of the pipe chamber 2 is provided. Further, the indoor unit 100 has a feature in that the controller 10 detects the leakage of refrigerant based on the measurement value (temperature T of the pipe chamber 2) of the temperature sensor 24, that is, determines whether or not leakage of refrigerant occurs. In the following, detailed description is made.

When the flare connection is released at the connection portion G provided in the pipe chamber 2, and the external connection pipe 20 is separated from the connection portion G, the refrigerant having a pressure higher than the atmospheric pressure in the refrigerant circuit is forcefully discharged from both the external connection pipe 20 and the communication pipe 11 into the pipe chamber 2 under the atmospheric pressure. The pressure of the leaked refrigerant discharged into the pipe chamber 2 is abruptly reduced, with the result that the refrigerant is evaporated immediately after the leakage. In such a situation, the space in the pipe chamber 2 is immediately brought into a state in which the refrigerant gas is rich (a ratio of the refrigerant gas is high). The pressure in the pipe chamber 2 is raised to a pressure higher than the atmospheric pressure along with the evaporation of the leaked refrigerant.

The temperature of the leaked refrigerant gas immediately after the evaporation in the pipe chamber 2 reaches a value which is close to a boiling point of the refrigerant under the atmospheric pressure. Thus, the temperature is considerably low. For example, when the refrigerant used in the indoor unit 100 is a refrigerant mixture with the weight ratio of HFO1234yf:R32=4:6, the boiling point of the refrigerant under the atmospheric pressure is about −50 degrees Celsius. Therefore, the temperature of the leaked refrigerant gas evaporated in the pipe chamber 2 is close to −50 degrees Celsius immediately after the evaporation.

As described above, when the flare connection at the connection portion G is released, and the refrigerant is discharged into the pipe chamber 2, the space in the pipe chamber 2 is immediately changed to a space in which the low-temperature leaked refrigerant gas is rich. As a result, the temperature of the gas atmosphere in the pipe chamber 2 abruptly falls from the temperature close to the room temperature given before the leakage. Further, the partition plate 23 and the casing 5 are deprived of the evaporation heat by the evaporation of the leaked refrigerant, or are directly cooled by the evaporated leaked refrigerant gas, with the result that the surface temperature of the wall surfaces of those facing the pipe chamber 2 also abruptly falls as compared to the temperature before the leakage as in the gas atmosphere in the pipe chamber 2.

As described above, when the leakage of refrigerant due to the release of the flare connection at the connection portion G occurs, the temperature T of the pipe chamber 2 abruptly falls. Therefore, in the indoor unit 100, the temperature sensor 24 configured to measure the temperature T of the pipe chamber 2 is provided in the pipe chamber 2. Through use of the detection value of the temperature sensor 24, the controller 10 detects occurrence of the fast leakage of refrigerant. As described above, the refrigerant leakage detection sensor of the indoor unit 100 is the temperature sensor 24 for the pipe chamber 2, and the controller 10 determines whether or not the leakage of refrigerant occurs based on a result of detection by the temperature sensor 24.

Now, description is made of a method by which the controller 10 determines occurrence of the leakage of refrigerant in the pipe chamber 2 based on the detection value of the temperature sensor 24. As described above, the low-temperature leaked refrigerant gas which is evaporated immediately after the leakage causes the temperature T of the pipe chamber 2 to be significantly lower than the room temperature of the room in which the indoor unit 100 is installed. Therefore, the controller 10 determines whether or not the leakage of refrigerant occurs based on the detection value of the temperature sensor 24, that is, the temperature T of the pipe chamber 2.

Figure 6:
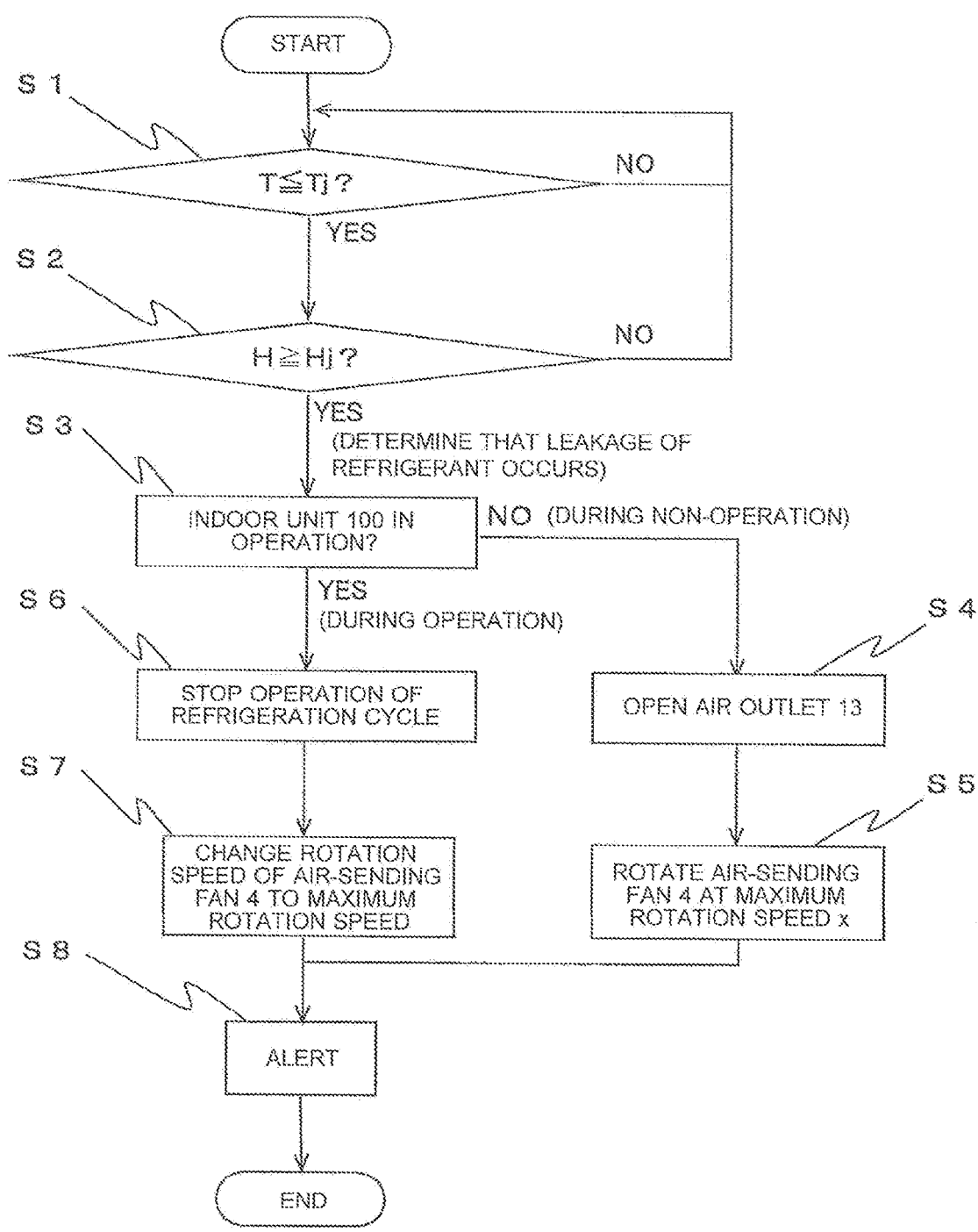
FIG. 6 is a control flowchart for the indoor unit for an air-conditioning apparatus illustrated in FIG. 1.

FIG. 6 is a control flowchart for the controller 10 to determine whether or not the leakage of refrigerant occurs based on the temperature T of the pipe chamber 2 being the detection value of the temperature sensor 24. The determination control flow is the same during both operation and non-operation of the indoor unit 100. Even during the non-operation of the indoor unit 100, the controller 10 grasps the temperature T of the pipe chamber 2 and executes the control flow.

As illustrated in FIG. 6, the controller 10 determines in Step S1 whether or not the temperature T of the pipe chamber 2 being the detection value of the temperature sensor 24 is equal to or less than a predetermined determination reference temperature Tj. Herein, a condition of Tj<0 is given. When T>Tj (NO in the determination of Step S1), Step S1 is repeated. When T≤Tj (YES in the determination of Step S1), the controller 10 determines next in Step S2 whether or not a time period H in the state of T≤Tj is equal to or more than a reference time period Hj. When T>Tj is given within a time period less than the reference time Hj (NO in the determination of Step S2), the process returns to the determination of Step S1. Since the condition of Tj<0 is given, T<0 when T<Tj. Therefore, an absolute value of T is larger than an absolute value of Tj.

When the controller 10 determines in Step S2 that the state of T≤Tj continues for at least the time period Hj, that is, when H≥Hj (YES in the determination of Step S2), the controller 10 determines that the leakage of refrigerant is occurring in the pipe chamber 2. When the fast leakage of refrigerant occurs in the pipe chamber 2, the abruptly evaporated refrigerant gas causes the pressure in the pipe chamber 2 to be higher than the atmospheric pressure. As described above, the drain pan 19 passes through the partition plate 23 to extend over the heat exchanger chamber 1 and the pipe chamber 2, and the heat exchanger chamber 1 and the pipe chamber 2 communicate with each other through the opening of the upper surface of the drain pan 19. Therefore, the leaked refrigerant gas in the pipe chamber 2 is pushed out from the pipe chamber 2 and flows out into the heat exchanger chamber 1 along the upper surface opening of the drain pan 19.

When the controller 10 determines that the leakage of refrigerant is occurring in accordance with the determination result of Step S2 (that is, determination of YES in Step S2), the controller 10 determines next in Step S3 whether or not the indoor unit 100 is in operation. When the indoor unit 100 is not operating (NO in the determination of Step S3), in next Step S4, the controller 10 immediately causes the up-and-down wind direction plates 16 of the blowing unit 15 to turn to, for example, the orientation illustrated in FIG. 3 to open the air outlet 13, and in Step S5, causes the air-sending fan 4 to rotate. At this time, the rotation speed of the air-sending fan 4 is a presettable maximum rotation speed.

Meanwhile, when the indoor unit 100 is in operation (YES in the determination of Step S3), the air outlet 13 is already in an open state, and the air-sending fan 4 is rotated. However, the controller 10, in Step S6, immediately stops the compressor of the refrigeration circuit to stop the operation of the refrigeration cycle, and, in Step S7, changes (increases) the rotation speed of the air-sending fan 4 to the presettable maximum rotation speed. When the air-sending fan 4 is rotated at the maximum rotation speed, the rotation speed is maintained.

During both operation and non-operation, the controller 10, in Step S8, immediately gives an alert at the same time to inform a user of the fast leakage of flammable refrigerant in the indoor space and prompt ventilation of the room. The user is informed of the occurrence of the leakage of refrigerant by the alert so that the user may open a window or door or may turn on a ventilation fan to perform ventilation of the room in which the indoor unit 100 is installed. Further, the user may contact a service worker. The alert is given through actions on both the auditory sense of a user and the visual sense of a user. The alert through the action on the auditory sense of a user may include sound of a buzzer or artificial sound. The alert through the action on the visual sense of a user may include illumination of an LED light on a front surface of the casing 5.

The air-sending fan 4 is rotated at the maximum rotation speed in Step S5 or Step S7. Thus, a suction effect of the air-sending fan 4 causes the leaked refrigerant gas in the pipe chamber 2 to be guided to the heat exchanger chamber 1 through the upper surface opening of the drain pan 19 having the right-side end portion protruding into the pipe chamber 2. Then, the leaked refrigerant gas merges with the air flow which is generated by the air-sending fan 4 from the air inlet 12 to the air outlet 13, and is blown into the indoor space through the air outlet 13 and forcibly and widely diffused in the indoor space. As a result, the gas atmosphere of the leaked refrigerant having the flammable concentration is prevented from being formed around the indoor unit 100, thereby maintaining the safety.

When the indoor unit 100 is not operating, the leaked refrigerant gas may flow out through the air inlet 12 in the lower portion of the casing 5 during a period from occurrence of the fast leakage of refrigerant due to the release of connection at the connection portion G to the start of rotation of the air-sending fan 4 in Step S5. However, since the controller 10 is configured to detect the leakage of refrigerant and then immediately control the air-sending fan 4 to rotate at the maximum rotation speed, the leaked refrigerant gas having flowed out before the start of rotation of the air-sending fan 4 is sucked together with the indoor air through the air inlet 12 and blown out through the air outlet 13, thereby being forcibly diffused in the indoor space.

The gas atmosphere of the leaked refrigerant having the flammable concentration may be temporarily formed in the casing 5 (for example, in the pipe chamber 2). However, there is no ignition source in the casing 5, and hence there is no fear in that the leaked refrigerant catches fire. The electrical component unit 9 is arranged in the pipe chamber 2. However, in the electrical component unit 9, the electric board is accommodate in a sealed container made of metal.

Therefore, even when a spark is generated by a short circuit in the electric board, the electric board does not become the ignition source.

Now, Step S1 and Step S2 are specifically described. The refrigerant mixture having the weight ratio of HFO1234yf: R32=4:6 is used as the refrigerant, and the boiling point of the refrigerant under the atmospheric pressure is −50 degrees Celsius. Thus, the determination reference temperature Tj=−30 degrees Celsius is set. Further, in order to prevent erroneous detection due to an accidental or sudden detection signal error in the temperature sensor 24 caused by noise or other factor, it is not immediately determined that the leakage of refrigerant is occurring as soon as T≤Tj is given in Step S1, and determination is made in next Step S2 on whether or not the state of T≤Tj continues for the reference time period Hj. The determination of YES in Step S2 is set as the condition for determination that the leakage of refrigerant is occurring. Herein, the reference time period Hj=3 seconds is set.

Whether the indoor unit 100 performs the cooling operation or the heating operation, or the indoor unit 100 is not operating, the controller 10 receives inputs of the temperature T of the pipe chamber 2 being the detection value of the temperature sensor 24 (temperature of the gas atmosphere in the pipe chamber 2, or surface temperature of the wall surface of the casing 5 or partition plate 23, which faces the pipe chamber 2). When the state in which the temperature T is equal to or less than −30 degrees Celsius continues for 3 seconds, the controller 10 determines that the fast leakage of refrigerant is occurring in the pipe chamber 2.

The fast leakage of refrigerant caused by the release of the flare connection at the connection portion G provided in the pipe chamber 2 immediately causes the space in the pipe chamber 2 to be brought into the state in which the leaked refrigerant gas is rich. Therefore, the temperature T of the pipe chamber 2 becomes equal to or less than the determination reference temperature Tj within a short time period of less than 20 seconds. Further, the reference time period Hj for prevention of the erroneous detection is also short to the level of several seconds. Thus, the controller 10 is capable of detecting the occurrence of leakage of refrigerant within a short time period of several ten seconds less than 1 minute from occurrence of the leakage of refrigerant. Therefore, the indoor unit 100 is highly safe.

Further, in Step S1, only a simple determination of whether or not the temperature T in the pipe chamber is equal to or less than determination reference temperature Tj (Tj<0), and it is determined that leakage of refrigerant is occurring when the state of T≤Tj continues for the reference time period Hj. With such determination, the erroneous detection due to the accidental or sudden detection signal error in the temperature sensor 24 caused by noise or other factor is prevented. Further, the determination reference temperature Tj is set to a low temperature which is unlikely unless the leakage of refrigerant occurs. Therefore, such setting prevents erroneous detection of determining that leakage of refrigerant is occurring even though the refrigerant does not leak. Accordingly, highly reliable detection for the occurrence of leakage of refrigerant can be performed, and hence the indoor unit 100 is highly reliable.

Figure 7:
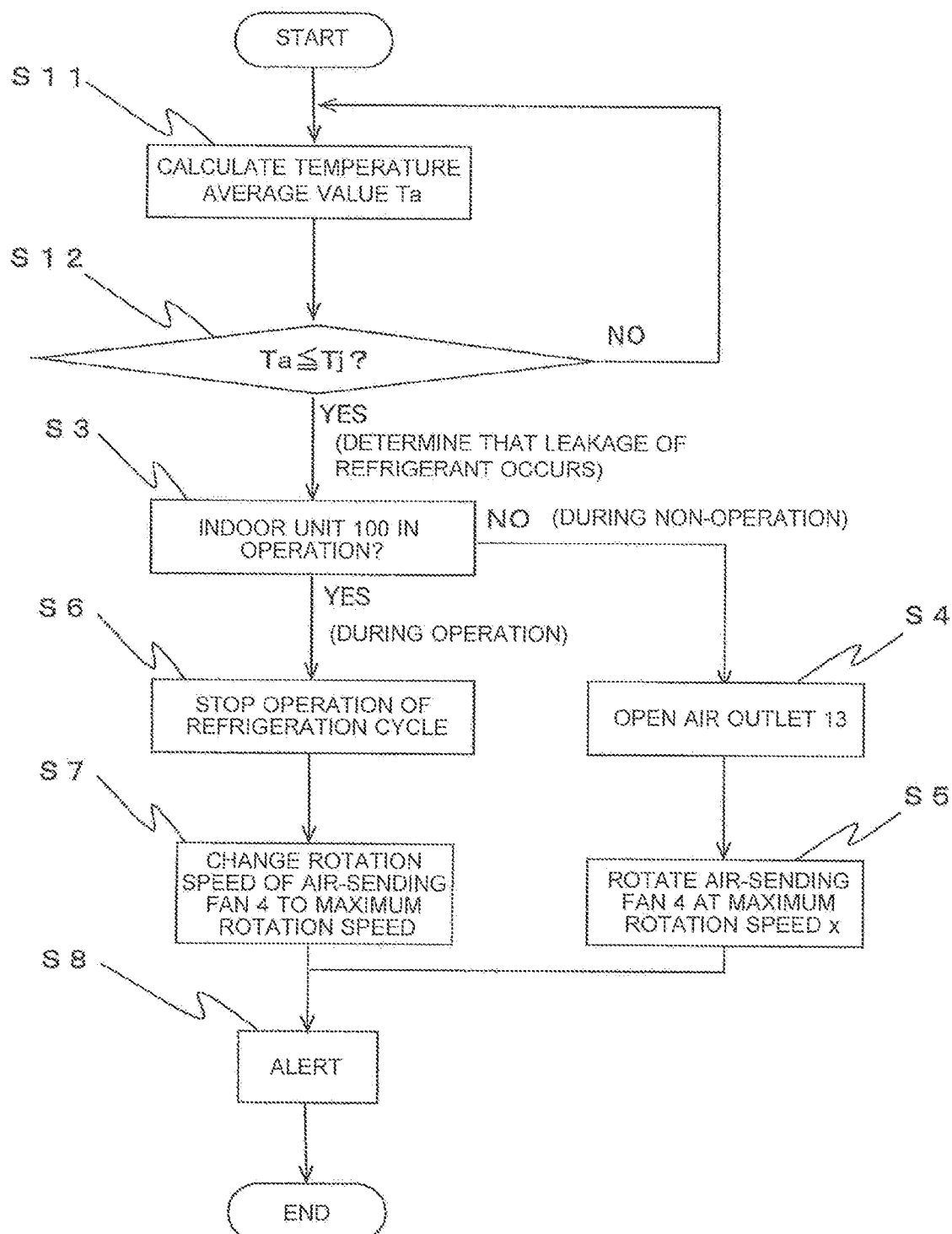
FIG. 7 is a control flowchart of Modification Example 1 for the indoor unit for an air-conditioning apparatus illustrated in FIG. 1.

For the prevention of the erroneous detection due to the accidental or sudden detection signal error in the temperature sensor 24, a control flow being different from the control flow described above is conceivable. Now, description is made of modification examples of the determination control flow for the leakage of refrigerant. FIG. 7 is a control flowchart of Modification Example 1, which is different from the control flowchart of FIG. 6. In the control flow of FIG. 7, in Step 11 in place of Step 1 and Step 2 of FIG. 6, the controller 10 first uses detection values of the temperature sensor 24 to calculate an average value Ta of the temperature T of the pipe chamber 2 in a predetermined reference time period Hm (for example, Hm=2 seconds) prior to a current timing or a timing slightly before the current timing (for example, by 0.1 second). The controller 10 always updates the temperature average value Ta to the average value Ta in the latest reference time period Hm.

In subsequent Step S12, the controller 10 determines whether or not the average value Ta of the temperature T of the pipe chamber 2 in the reference time period Hm is equal to or less than the determination reference temperature Tj (Tj<0). When Ta>Tj is given (NO in the determination of Step S12), the controller 10 repeats the process from Step S11. When Ta≤Tj is given (YES in the determination of Step S12), the controller 10 determines that the leakage of refrigerant is occurring. The subsequent flow is the same as that of FIG. 6. Also in this case, the erroneous detection due to the accidental or sudden detection signal error in the temperature sensor 24 can be prevented, and the determination is highly reliable. The condition Tj<0 is given. Thus, Ta<0 when Ta<Tj, and an absolute value of Ta is larger than an absolute value of Tj.

Further, as described above, when the fast leakage of refrigerant occurs in the pipe chamber 2, the abruptly evaporated leaked refrigerant gas causes the temperature T of the pipe chamber 2 to abruptly fall from the temperature close to the room temperature given before the occurrence of leakage. In view of such a situation, without direct use of the temperature T of the pipe chamber 2 as the determination reference as in the determination control flow described above, the controller 10 may employ the control flow of grasping the falling rate of the temperature T of the pipe chamber 2 and determining the occurrence of the leakage of refrigerant through use of the falling rate.

Figure 8:
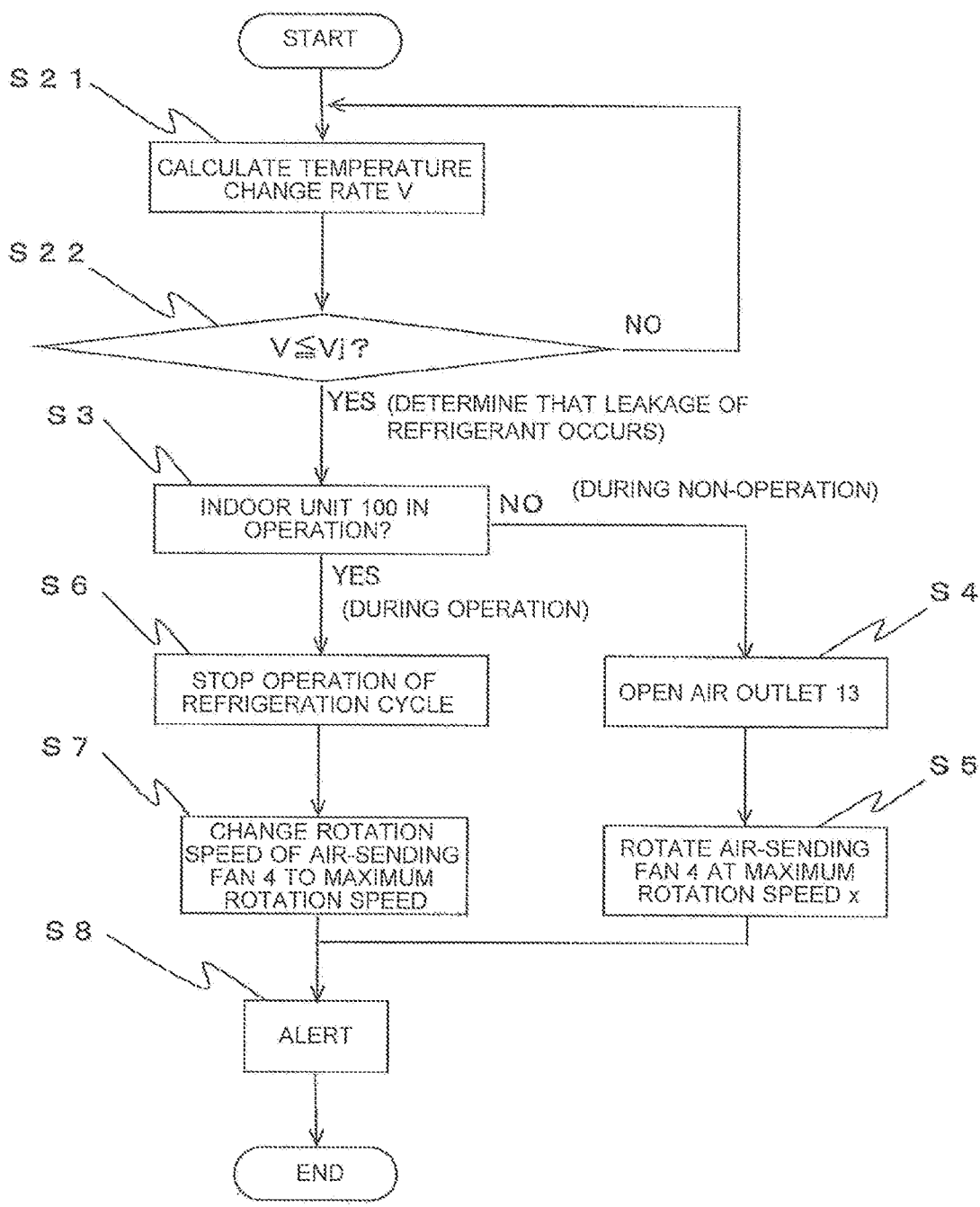
FIG. 8 is a control flowchart of Modification Example 2 for the indoor unit for an air-conditioning apparatus illustrated in FIG. 1.

FIG. 8 is a control flowchart of Modification Example 2 using a change rate V of the temperature T of the pipe chamber 2. In the control flow of FIG. 8, in Step S21 in place of Step S1 and Step S2 of FIG. 6, the controller 10 captures and stores the temperature T of the pipe chamber 2 from the temperature sensor 24, and calculates the change rate V (degrees Celsius/second) of the temperature T of the pipe chamber 2 based on a change amount with respect to a temperature Tp of the pipe chamber 2 in the past (ΔT=T−Tp), which is already stored.

In subsequent Step S22, the controller 10 determines whether or not the change rate V (degrees Celsius/second) calculated in Step S21 is equal to or less than a predetermined determination reference rate Vj. The condition Vj<0 is given, and the temperature change indicates the fall of temperature. When V>Vj (NO in the determination of Step S22), the controller 10 repeats the routine from Step S21. When V≤Vj (YES in the determination of Step S22), the controller 10 determines that the leakage of refrigerant is occurring. The subsequent flow is the same as that of FIG. 6. Even when the indoor unit 100 is not operating, the controller 10 receives inputs of the temperature T of the pipe chamber 2 to grasp the change rate V and perform the above-mentioned control flow. The condition Vj<0 is given. Thus, V<0 when V<Vj, and an absolute value of V is larger than an absolute value of Vj.

When the fast leakage of refrigerant is not occurring in the pipe chamber 2, the change in temperature T of the pipe chamber 2 is in conformity with the change in room temperature of the room in which the indoor unit 100 is installed, regardless of whether the indoor unit 100 is during operation or non-operation. During non-operation of the indoor unit 100, the room temperature changes in conformity with the outdoor temperature. Therefore, the temperature gently changes, for example, by 2 degrees Celsius in 1 hour. During operation of the indoor unit 100, even when rapid cooling or powerful cooling operation is started, the room temperature falls at 1 degree/minute at most.

When the leakage of refrigerant due to the release of the flare connection occurs in the pipe chamber 2, as described above, the temperature T of the pipe chamber 2 falls in seconds from the room temperature to the temperature close to the boiling temperature of the refrigerant under the atmospheric pressure. Therefore, the temperature change has a change rate being incommensurable with the temperature change in the pipe chamber 2 under the state in which the fast leakage of refrigerant is not occurring. Therefore, the determination reference rate Vj may be set to a value, for example, Vj=−1 degree Celsius/second which does not cause erroneous detection of the fall of the room temperature at 1 degree/minute as occurrence of the leakage of refrigerant. As described above, the determination reference rate Vj is set to the change rate which is unlikely unless the leakage of refrigerant occurs. Therefore, such setting prevents erroneous detection of determining that leakage of refrigerant occurs even though the refrigerant does not leak.

When V≤Vj in Step S22 (YES in the determination of Step S22), the controller 10 determines whether or not a subsequent time period H with continuation of a state of V≤Vj is equal to or more than the predetermined reference time period Hj. When it is determined that the state of V≤Vj continues for at least the time period Hj, that is, when H≥Hj is given, it may be determined that the leakage of refrigerant is occurring in the pipe chamber 2.

Figure 9:
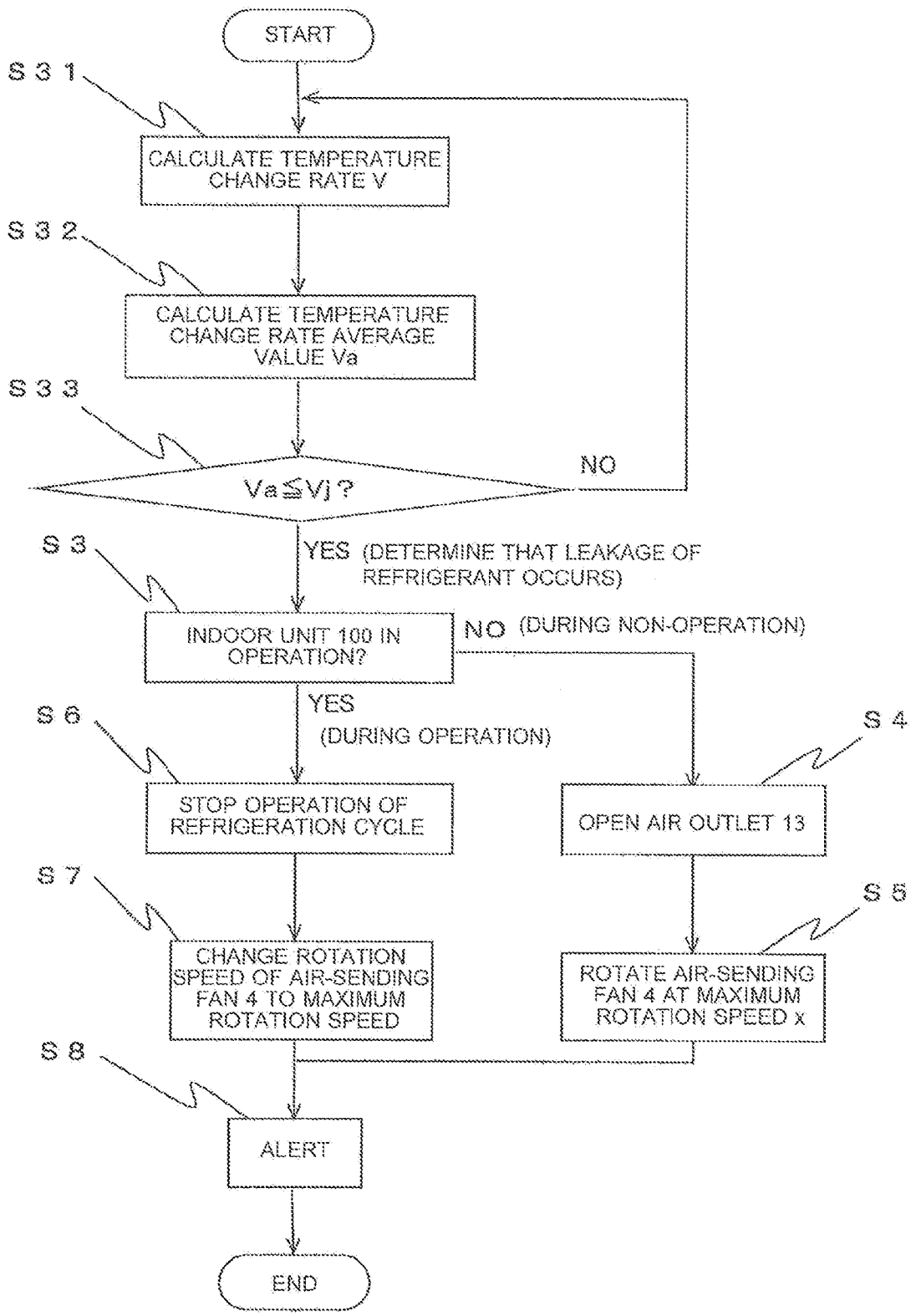
FIG. 9 is a control flowchart of Modification Example 3 for the indoor unit for an air-conditioning apparatus illustrated in FIG. 1.

Next, FIG. 9 is a control flowchart of Modification Example 3 similarly using the change rate V of the temperature T of the pipe chamber 2. In Step S31, the controller 10 calculates and stores the change rate V of the temperature T of the pipe chamber 2 as in Step S21. Then, in subsequent Step S32, the controller 10 calculates an average value Va of the change rate V for a predetermined reference time period Hn (for example, Hn=1 second). The controller 10 always updates the change rate average value Va to the average value Va in the latest reference time period Hn.

In subsequent Step S33, the controller 10 determines whether or not the change rate average value Va in the reference time period Hn is equal to or less than the determination reference temperature Vj (Vj<0). When Va>Tj (NO in the determination of Step S33), the controller 10 repeats the routine from Step S31. When Va≤Vj (YES in the determination of Step S33), the controller 10 determines that the leakage of refrigerant is occurring. The subsequent control is the same as that of FIG. 6. Also in this case, the erroneous detection due to the accidental or sudden detection signal error of the temperature sensor 24 can be prevented, and the determination is highly reliable. The condition Vj<0 is given. Thus, Va<0 when Va<Vj, and an absolute value of Va is larger than an absolute value of Vj.

As described above, for the fast leakage of refrigerant caused by, such as, the release of connection at the connection portion G in the pipe chamber 2, which may cause formation of the gas atmosphere of the leaked refrigerant gas having the flammable concentration range in the indoor space, with a focus on the characteristic that the temperature T of the pipe chamber 2 abruptly falls due to the abrupt evaporation of the leaked refrigerant discharged to the pipe chamber 2, the indoor unit 100 uses such characteristic for early detection of the occurrence of the leakage of refrigerant. Therefore, the temperature sensor 24 configured to measure the temperature T of the pipe chamber 2 is provided in the pipe chamber 2, and the controller 10 determines whether or not the leakage of refrigerant is occurring based on the temperature T of the pipe chamber 2 being the detection value of the temperature sensor 24.

Here, the expression "based on the temperature T of the pipe chamber 2" means that the determination of whether or not the temperature T of the pipe chamber 2, which may be the temperature average value Ta for the predetermined time period, is equal to or less than the determination reference temperature Tj (Tj<0), or the determination of whether or not the change rate V of the temperature T of the pipe chamber 2, which may be the change rate average value Va for the predetermined time period, is equal to or less than the determination reference rate Vj (Vj<0) is performed so that the temperature T of the pipe chamber 2 measured by the temperature sensor 24 is used for the determination of occurrence of the leakage of refrigerant. It is preferred that the temperature T of the pipe chamber 2 to be measured by the temperature sensor 24 be a temperature of the gas atmosphere in the pipe chamber 2. However, the temperature T of the pipe chamber 2 may be a surface temperature of a component provided in the pipe chamber 2 or a component facing the pipe chamber 2.

As described above, the indoor unit 100 measures the temperature at a location where the fast leakage of refrigerant is occurring, to thereby detect occurrence of the leakage of refrigerant based on the abrupt temperature change caused by the leakage of refrigerant. Therefore, the leakage of refrigerant can be detected within a short time period from the occurrence. Further, the process to determine determine the occurrence of leakage of refrigerant is simple, and the difference in temperature (temperature T of the pipe chamber 2) subjected to the determination is clearly different between the case in which the leakage of refrigerant is not occurring and the case in which the leakage of refrigerant is occurring. Therefore, both in operation and non-operation of the indoor unit 100, the erroneous determination of occurrence of leakage of refrigerant even though the refrigerant is not leaking can be prevented. Accordingly, the indoor unit 100 is excellent in safety and reliability.

As illustrated in FIG. 5, in the indoor unit 100, the temperature sensor 24 configured to measure the temperature T of the pipe chamber 2 (herein configured to measure the temperature of the gas atmosphere in the pipe chamber 2) is provided at a position below the electrical component unit 9 in the upper-and-lower direction and close to the electrical component unit 9. The leaked refrigerant gas has a property of being heavier than air. Therefore, there is also an idea that the temperature sensor 24 is preferably arranged in a lower portion of the pipe chamber 2, for example, below the connection portion G.

However, when the leakage of refrigerant due to the release of connection of the connection portion G occurs, the refrigerant forcefully jets from both the communication pipe 11 and the external connection pipe 20, and the jetted refrigerant is abruptly vaporized. Thus, the pipe chamber 2 is brought into a state close to the state of being filled with the leaked refrigerant gas in a short time period. Therefore, the early detection can be performed regardless of the position of the temperature sensor 24 in the pipe chamber 2. In the indoor unit 100, the temperature sensor 24 is arranged close to the electrical component unit 9 as illustrated in FIG. 5 so as to shorten the signal line 24a and simplify the routing of the signal line 24a. Therefore, the position of the temperature sensor 24 in the upper-and-lower direction is below the electrical component unit 9 and above the connection portion G.

In the above, description is made of the indoor unit 100 having the following configuration. The air inlet 12 is arranged in the lower portion of the casing 5, and the air outlet 13 is arranged in the upper portion of the casing 5. The heat exchanger 3 is arranged on upstream with respect to the air flow generated by the air-sending fan 4, and the air-sending fan 4 is arranged on downstream. However, the configuration of the indoor unit 100 is not limited to the above-mentioned configuration. The present invention is applicable, as long as the indoor unit has the pipe chamber 2 which is provided separately from the heat exchanger chamber 1 having an air passage allowing the air to flow from the air inlet 12 to the air outlet 13 generated by the air-sending fan 4 and has the connection portion G between the communication pipe 11 and the external connection pipe 20 arranged therein, and the same effect can be achieved.

For example, there may be provided a configuration in which the air outlet 13 is positioned below the air inlet 12, or a configuration in which the indoor air is sucked through the air inlet 12 positioned at a center of the casing 5 in the upper-and-lower direction to allow conditioned air to blow out simultaneously from the air outlets 13 positioned on both above and below the air inlet 12 or to blow out through only one of the air outlets 13 depending on whether the operation is the cooling operation or the heating operation.

Further, there may be provided a configuration in which the heat exchanger 3 is positioned on downstream with respect to the air flow generated by the air-sending fan 4, and the air-sending fan 4 is positioned on upstream. The shape of the heat exchanger 3 is not limited to the upwardly open V-shape in side view. The heat exchanger 3 may have any one of a downwardly open V-shape, an I-shape, an L-shape, and a J-shape. The air-sending fan 4 is not also limited to the cross-flow fan, and may be a propeller fan or a turbo fan.

The indoor unit 100 is of the floor-installation type. However, even when the indoor unit 100 is of a wall-mounting type to be mounted to an upper portion of a wall surface of a room or a ceiling-mounting type to be mounted to a ceiling, the present invention is applicable as long as the indoor unit has the pipe chamber 2 in which the connection portion G between the communication pipe 11 and the external connection pipe 20 is provided. However, with regard to the indoor unit to be installed on an upper portion of a wall surface or on a ceiling, even when the leaked refrigerant gas flows out through the air outlet or the air inlet of the indoor unit, the refrigerant gas flows out from a high position in the indoor space. Therefore, the leaked refrigerant gas being heavier than air is likely to be diffused when the leaked refrigerant gas flows down to a floor surface. Therefore, the leaked refrigerant gas is less liable to stagnate at a specific location in the indoor space, and hence the gas atmosphere of the refrigerant having the flammable concentration is less liable to be formed as compared to the floor-installation type. Thus, the present invention can be maximally effective in the indoor unit of the floor-installation type.

The refrigerant mixture of HFO1234yf and HFC32 having the flammability as the refrigerant flows into the heat exchanger 3 of the indoor unit 100. However, as described above, the present invention is particularly effective in the viewpoint of safety with respect to general flammable refrigerants including a refrigerant having mild flammability. However, even in a case of an indoor unit for an air-conditioning apparatus using non-flammable refrigerant, application of the present invention enables the controller 10 to detect occurrence of the fast leakage of refrigerant in an early stage. Thus, a user can find out the leakage of refrigerant in a short time period after occurrence of the leakage of refrigerant. Therefore, unnecessary operation with non-satisfactory cooling or heating due to the shortage of refrigerant can be avoided, and a user may immediately contact with a service worker to achieve repair in an early stage.

Embodiment 2

Figure 10:
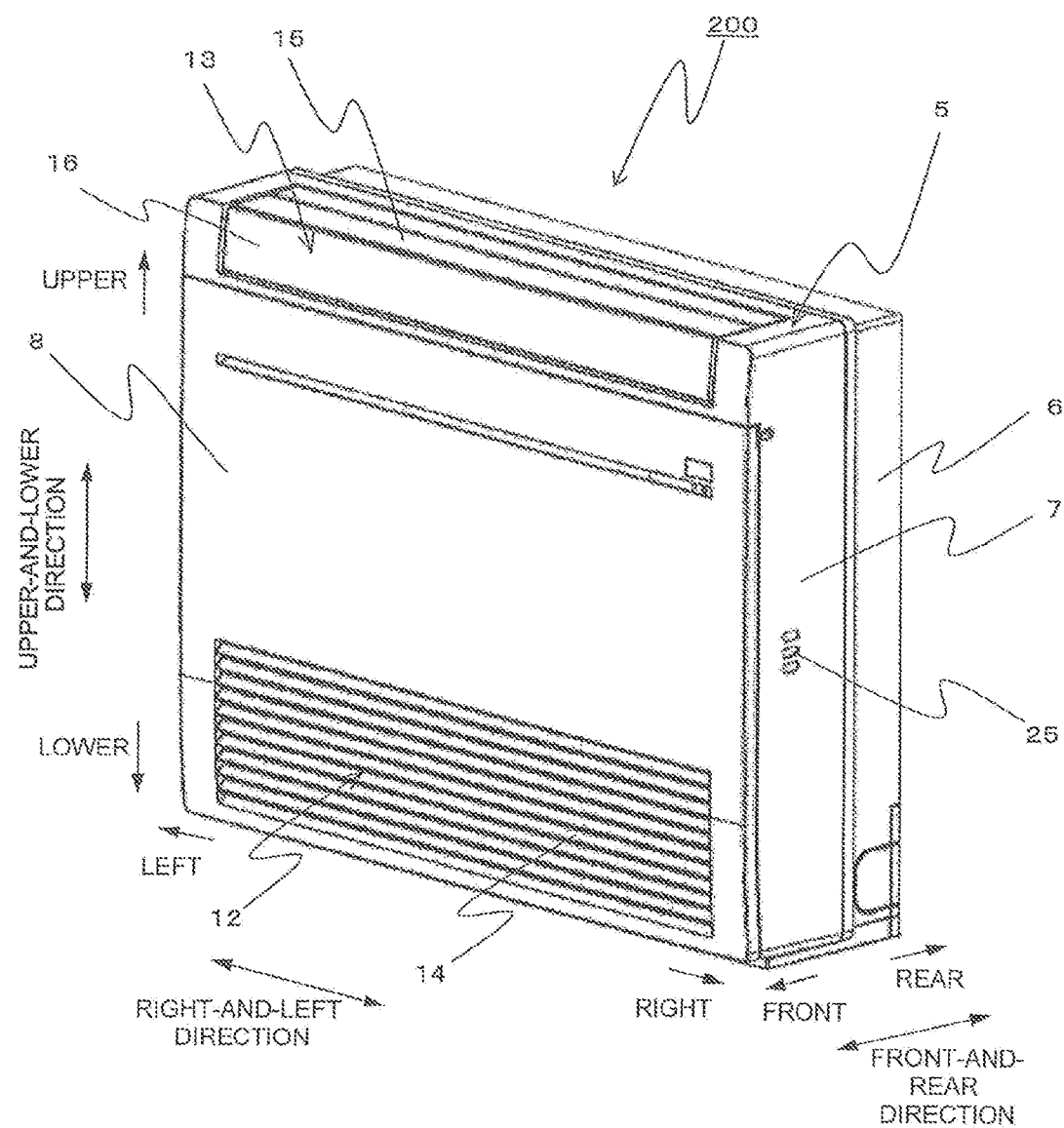
FIG. 10 is an external perspective view of an indoor unit for an air-conditioning apparatus according to Embodiment 2 of this invention.

Next, description is made of Embodiment 2 of this invention with reference to the drawings. A basic configuration of an indoor unit 200 for an air-conditioning apparatus according to Embodiment 2 (hereinafter referred to as "indoor unit 200") is the same as that of the indoor unit 100 according to Embodiment 1. The same components are denoted by the same reference symbols, and detailed description is omitted. FIG. 10 is an external perspective view of the indoor unit 200 and corresponds to FIG. 1 of Embodiment 1. As illustrated in FIG. 10, the indoor unit 200 is different in configuration from the indoor unit 100 according to Embodiment 1 in that the casing 5 has a ventilation port 25 which enables communication of air between the pipe chamber 2 and an indoor space of a room in which the indoor unit 200 is installed.

Figure 11:
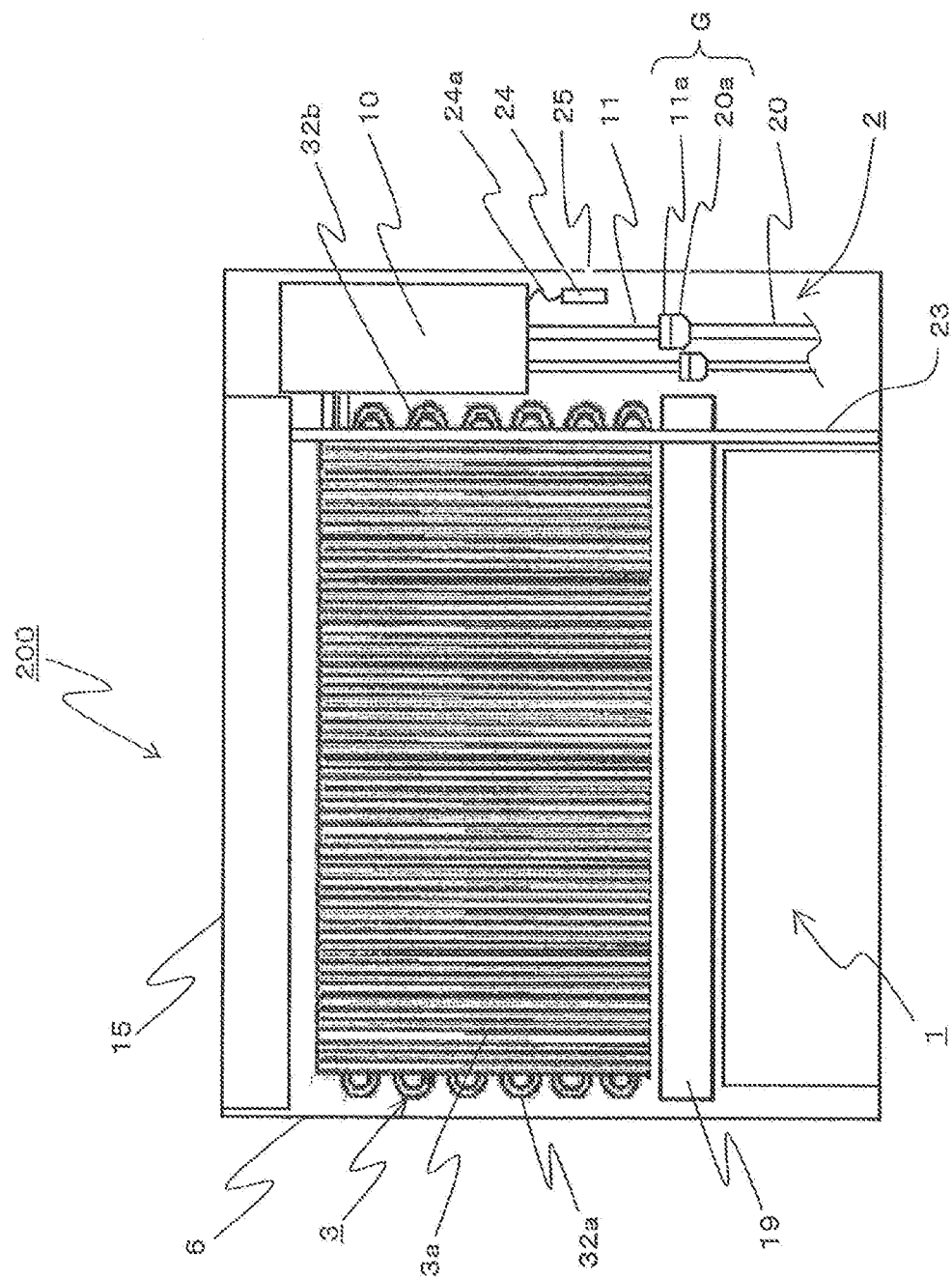
FIG. 11 is a schematic view for illustrating a state in which a front side portion of the indoor unit for an air-conditioning apparatus illustrated in FIG. 10 is removed, as viewed from a front side.

FIG. 11 corresponds to FIG. 5 of Embodiment 1 but is a schematic view for illustrating a state in which the front-side casing 7 and other components of the indoor unit 200 according to Embodiment 2 are removed, as viewed from a front side. As illustrated in FIG. 10, the ventilation port 25 is formed in the right side surface of the front-side casing 7. However, for easy understanding of the description, the ventilation port 25 is illustrated at a corresponding position also in FIG. 11 for convenience.

The ventilation port 25 is formed so as to penetrate in a right-and-left direction through a portion of the right side surface of the casing 5 (which is herein the front-side casing 7), and a plurality of holes each having an oval shape or a rectangular shape in the front-and-back direction being a longitudinal direction are formed next to each other under a state of being close to each other in the upper-and-lower direction. Therefore, the indoor space of the room in which the indoor unit 200 is installed and the pipe chamber 2 communicate with each other through the ventilation port 25, and are capable of communicating air through the ventilation port 25.

The ventilation port 25 is formed in the casing 5 at a position of facing the temperature sensor 24. In other words, the temperature sensor 24 configured to measure the temperature T of the pipe chamber 2 and the ventilation port 25 are opposed to each other. The temperature sensor 24 and the ventilation port 25 are opposed to each other in the right-and-left direction. Further, the temperature sensor 24 is arranged at a position close to the ventilation port 25. In the right-and-left direction in which the temperature sensor 24 and the ventilation port 25 are opposed to each other, a distance between an opening of the ventilation port 25 on the pipe chamber 2 side and the temperature sensor 24 is about 10 mm. In the indoor unit 200, the ventilation port 25 is formed in the side surface of the casing 5. However, the ventilation port 25 may be formed in the back surface or the front surface of the casing 5.

As described above, the ventilation port 25 communicating to the pipe chamber 2 is opened in the casing 5. Thus, when the indoor unit 200 starts the cooling operation or the heating operation, the suction effect of the rotating air-sending fan 4 causes the air in the pipe chamber 2 to pass through the upper surface opening of the drain pan 19 extending over the heat exchanger chamber 1 and the pipe chamber 2 to reach the heat exchanger chamber 1, merge with the main air flow from the air inlet 12 to the air outlet 13, and pass through the heat exchanger 3. At the same time, the indoor air from the indoor space outside the casing 5 passes through the ventilation port 25 to flow into the pipe chamber 2 so as to supplement the air which is taken in from the pipe chamber 2 to the heat exchanger chamber 1 and flows out therefrom.

During the operation of the indoor unit 200, the rotation of the air-sending fan 4 forms a series of air flow, which is separated from the main air flow from the air inlet 12 to the air outlet 13 and has a flow rate significantly smaller than that of the main air flow, flowing in through the ventilation port 25, passing through the pipe chamber 2 and the upper surface opening of the drain pan 19, and flowing out to the heat exchanger chamber 1. During the operation of the indoor unit 200, such new indoor air always flows into the pipe chamber 2 through the ventilation port 25.

The temperature sensor 24 is positioned near the ventilation port 25 in the pipe chamber 2. Thus, the temperature sensor 24 can detect the temperature of the new indoor air which flows in through the ventilation port 25. The air temperature is basically equal to the temperature of the indoor air to be sucked through the air inlet 12 and may be assumed as an intake air temperature of the main air flow. Thus, it can be said that the air temperature corresponds to a current room temperature Tr. As described above, the temperature sensor 24 can measure the current room temperature Tr during the operation.

In the indoor unit 200, the temperature sensor 24 is used to detect occurrence of the fast leakage of refrigerant in the pipe chamber 2 as described in Embodiment 1, and is used also to measure the current room temperature Tr during the normal operation such as the cooling operation or the heating operation. That is, the temperature sensor 24 serves as a temperature detector configured to measure the temperature T of the pipe chamber 2 and as a temperature detector configured to measure the current temperature Tr so as to detect the fast leakage of refrigerant in the pipe chamber 2. This is the feature of Embodiment 2.

When the operation is performed under a state in which the leakage of refrigerant does not occur, T=Tr is given. The controller 10 uses the measurement value of the temperature sensor 24 provided in the pipe chamber 2 as the temperature T of the pipe chamber 2 to be used for the determination of whether or not the leakage of refrigerant occurs regardless of the operation or non-operation of the indoor unit 200. During the operation of the indoor unit 200, the controller 10 uses the measurement value of the temperature sensor 24 as the current room temperature Tr.

Thus, the controller 10 uses an input from the temperature sensor 24 as the temperature T of the pipe chamber 2, and performs the control flow of any one of FIG. 6 to FIG. 9 described in Embodiment 1 based on the input to determine whether or not the leakage of refrigerant occurs. Further, during the operation, the controller 10 uses the input from the temperature sensor 24 as the current room temperature Tr to compare a set temperature Ts with the input, and controls rotation speeds of the compressor and the outdoor air-sending fan of the outdoor unit and the rotation speed of the air-sending fan 4 of the indoor unit 200 based on a comparison result (for example, a temperature difference Ts−Tr of both). In such a manner, the refrigerant circulation amount in the refrigerant circuit and the heat exchange amount in the heat exchanger 3 are adjusted so that fine and energy-saving operation is performed, thereby being capable of providing a comfortable space to a user.

As described in Embodiment 1, the temperature sensor 24 may be provided at any position in the pipe chamber 2 to determine the occurrence of leakage of refrigerant. However, in Embodiment 2, the temperature sensor 24 is used as the detector for the current room temperature Tr during the operation of the indoor unit 200, and hence it is necessary to arrange the temperature sensor 24 on a course of a passage of the air flow from the ventilation port 25 to the heat exchanger chamber 1.

However, when the temperature sensor is provided at a position closer to the heat exchanger chamber 1, that is, at a position close to the partition plate 23 in the right-and-left direction, the partition plate 23, which is cooled or heated by the conditioned air cooled or heated by the heat exchanger 3 during the operation, may affect the temperature sensor 24 with the cooling or heating of the partition plate 23, with the result that accurate current room temperature may not be measured. Therefore, as in the indoor unit 200, it is preferred that the temperature sensor 24 be arranged at the position close to the ventilation port 25 or desirably, at the position opposed to the ventilation port 25.

Further, as illustrated in FIG. 11, in the indoor unit 200, the ventilation port 25 is formed at a position below the electrical component unit 9 in the upper-and-lower direction and close to the electrical component unit 9, and the temperature sensor 24 is positioned so as to face the ventilation port 25 in the right-and-left direction. Therefore, in the space below the electrical component unit 9 in the pipe chamber 2, the temperature sensor 24 is positioned in an upper portion. When the temperature sensor 24 used as a detection sensor for the leakage of refrigerant is also used as a temperature detection sensor configured to measure the current room temperature Tr during the normal operation, the arrangement of the temperature sensor 24 in the upper portion of the pipe chamber 2 is important in the case of the indoor unit of the floor-installation type on the following reasons.

Cool air has a larger density and weight as compared to hot air. Therefore, the temperature near a floor in the indoor space tends to be lower than a temperature of a space above the floor. Therefore, in the indoor unit 200 of the floor-installation type, when the ventilation port 25 is formed in the lower portion of the casing 5, and the temperature sensor 24 is arranged opposed to the ventilation port 25, that is, the temperature sensor 24 is positioned in the lower portion of the pipe chamber 2 near the bottom plate of the casing 5, the indoor air which flows in through the ventilation port 25 formed in the lower portion of the casing 5 is the indoor air near the floor.

Therefore, during the normal operation, the temperature sensor 24 measures the temperature of air having a relatively lower temperature in the indoor space, and the controller 10 grasps the temperature as the room temperature Tr. A user in the indoor space does not consider the temperature of the indoor air near the floor as the room temperature unless the user lays on the floor and considers the temperature higher than the temperature near the floor as the room temperature. Accordingly, there is a difference between the room temperature Tr grasped by the controller 10 and the room temperature felt by the user. Thus, there is a problem in that the indoor unit 200 cannot provide the comfortable space required by a user.

Therefore, in the indoor unit 200 of the floor-installation type, it is desired that the temperature sensor 24 to be used for measurement of the room temperature Tr during the normal operation be arranged in the upper portion of the pipe chamber 2 so that the difference between the room temperature Tr grasped by the controller 10 and the room temperature felt by a user be minimized. However, the electrical component unit 9 takes up an upper portion of the pipe chamber 2, and hence it is preferred that the temperature sensor 24 be arranged in an upper portion in the space below the electrical component unit 9. As a result, the temperature sensor 24 serves to measure the temperature T of the pipe chamber 2 and the current room temperature Tr, and hence the temperature detector configured to detect the fast leakage of refrigerant in the pipe chamber 2 is arranged in an upper portion in a space below the electrical component unit 9 of the pipe chamber 2.

The refrigerant is heavier than air. Therefore, there is an idea that the temperature detection sensor configured to detect the leakage of refrigerant is preferably arranged in a lower portion of the pipe chamber 2 at least below the connection portion G being a location of leakage. However, as described above, when the leakage of refrigerant due to the release of connection at the connection portion G occurs, the pipe chamber 2 is brought into the state close to the state of being filled with the leaked refrigerant gas in a short time period. Therefore, the early detection of the leakage of refrigerant can be performed regardless of the arrangement of the temperature sensor 24 in the pipe chamber 2. When the temperature sensor 24 is to be used for the measurement of the current room temperature Tr during the normal operation of the temperature sensor 24, it is preferred that the temperature sensor 24 be arranged in an upper portion of the pipe chamber 2 as described above.

In the indoor unit 200, the electrical component unit 9 takes up the upper portion of the pipe chamber 2. Thus, the temperature sensor 24 is provided at a position below the electrical component unit 9 and above the connection portion G in the pipe chamber 2. That is, the temperature sensor 24 is positioned between the electrical component unit 9 and the connection portion G in the upper-and-lower direction. When the temperature sensor 24 is arranged at such a position, the early detection of the leakage of refrigerant can be achieved. Further, the current room temperature Tr during the normal operation can be grasped as a temperature close to the room temperature felt by a user in the indoor space, thereby being capable of executing a operation control comfortable for a user.

Further, the temperature sensor 24 is arranged between the electrical component unit 9 and the connection portion G in the upper-and-lower direction in the pipe chamber 2. Thus, the signal line 24a of the temperature sensor 24 can be shortened, thereby achieving the effect of simplifying the routing of the signal line 24a.

In the indoor unit 200, when the fast leakage of refrigerant occurs in the pipe chamber 2, the leaked refrigerant gas is discharged through the ventilation port 25. However, when the controller 10 detects the leakage of refrigerant, the air-sending fan 4 is immediately rotated at the maximum rotation speed. Therefore, the leaked refrigerant gas which flows out through the ventilation port 25 into the indoor space is sucked through the air inlet 12 together with the indoor air and blown out through the air outlet 13, thereby being widely diffused into the indoor space.

In Embodiment 2, the temperature sensor 24 serves as the temperature detector configured to measure the temperature T of the pipe chamber 2 to be used by the controller 10 in the determination control flow for the presence or absence of occurrence of the leakage of refrigerant and the temperature detector configured to measure the current room temperature Tr to be used by the controller 10 in the operation control for the air-conditioning apparatus during the normal operation of the indoor unit 200. Therefore, the number of signal lines for the temperature detectors is reduced to simplify the structure of the indoor unit 200, thereby being capable of contributing to save resources and improve operability for the connection work of the external connection pipe 20.

Embodiment 3

Figure 12:
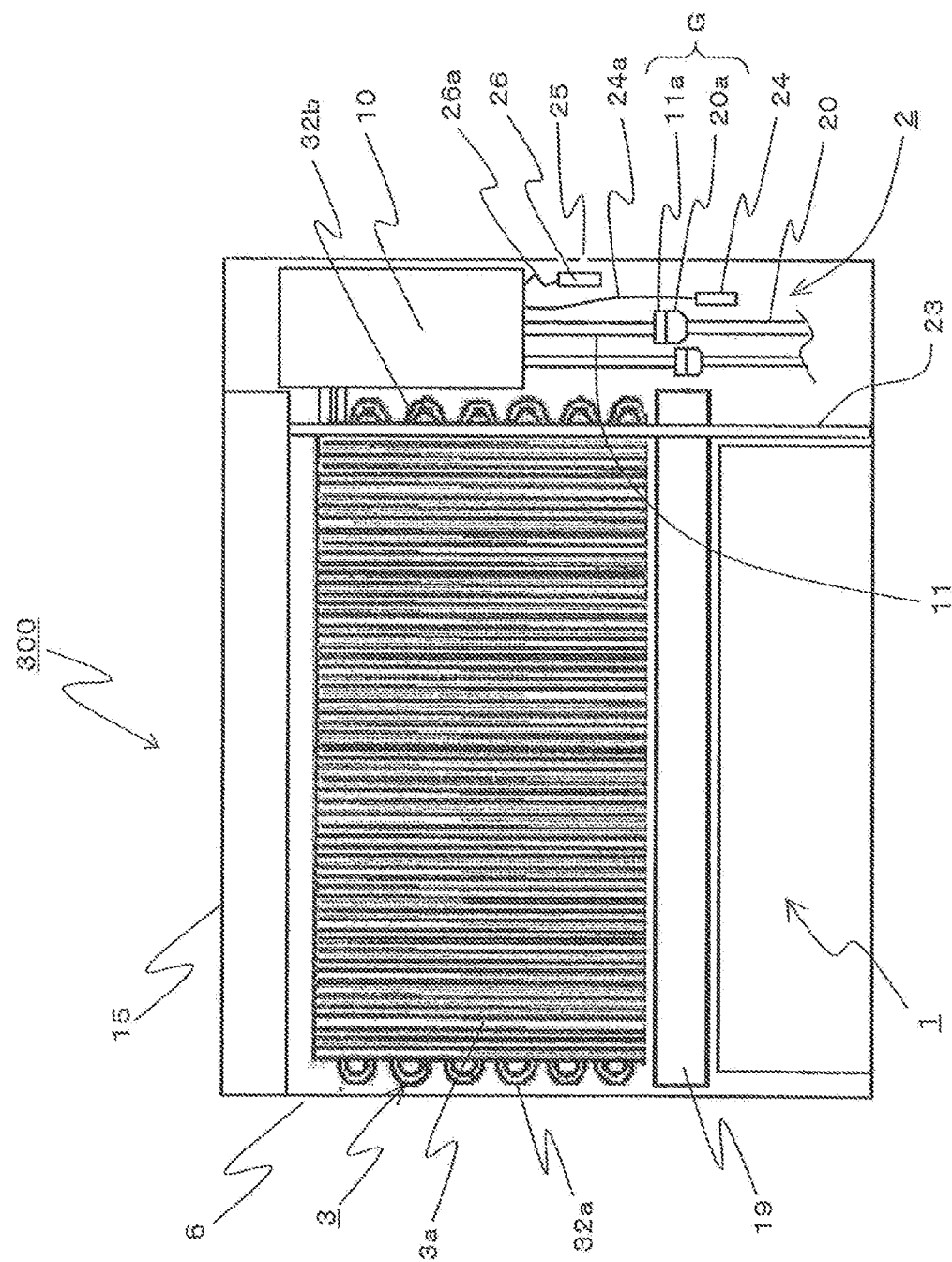
FIG. 12 is a schematic view for illustrating a state in which a front side portion of an indoor unit for an air-conditioning apparatus according to Embodiment 3 of this invention is removed, as viewed from a front side.

Next, description is made of Embodiment 3 of this invention with reference to the drawings. A basic configuration of an indoor unit 300 for an air-conditioning apparatus according to Embodiment 3 (hereinafter referred to as "indoor unit 300") is the same as those of the indoor unit 100 according to Embodiment 1 and the indoor unit 200 according to Embodiment 2. The same components are denoted by the same reference symbols, and detailed description thereof is omitted. An external perspective view of the indoor unit 300 is the same as that of the indoor unit 200, and FIG. 10 is referred. FIG. 12 is a schematic view, which corresponds to FIG. 11 of Embodiment 2, for illustrating a state in which the front-side casing 7 and other components of the indoor unit 300 according to Embodiment 3 are removed, as viewed from a front side. Similarly to Embodiment 2, the ventilation port 25 is formed in the right side surface of the front-side casing 7. For easy understanding of the description, the ventilation port 25 is illustrated also in FIG. 12 at a corresponding position for convenience.

The indoor unit 300 has a configuration different from that of the indoor unit 200 according to Embodiment 2 in that the indoor unit 300 includes the temperature sensor 24 for use in a refrigerant leakage detector, specifically, the temperature sensor 24 configured to detect the temperature T of the pipe chamber 2 to be used by the controller 10 for detection of the fast leakage of refrigerant in the pipe chamber 2, and a room temperature sensor 26 configured to detect the current room temperature Tr to be used by the controller 10 for comparison with the set temperature Ts for the operation control during operation, which are separated from each other. Similarly to the temperature sensor 24, a thermistor is used as the room temperature sensor 26, and the room temperature sensor 26 is connected to the electric board in the electrical component unit 9 via a signal line 26a.

In the indoor unit 300, the room temperature sensor 26 is arranged in the pipe chamber 2 so as to be opposed to the ventilation port 25 of the casing 5 in the right-and-left direction. The temperature sensor 24 is also provided in the pipe chamber 2. The room temperature sensor 26 may not be provided in the pipe chamber 2 and may be provided at a location isolated from the pipe chamber 2 to detect the current room temperature Tr. In any of those cases, the controller 10 executes the operation control during the normal operation based on the detection value of the room temperature sensor 26 and performs any of the control flows illustrated in FIG. 6 to FIG. 9 of Embodiment 1 based on the detection value of the temperature sensor 24.

In Embodiment 3, the temperature sensor 24 and the room temperature sensor 26 are separately provided. Thus, there is an advantage in that a thermistor having a characteristic suitable for a purpose of use can be selected and used. When the fast leakage of refrigerant occurs in the pipe chamber 2, as described in Embodiment 1, the temperature sensor 24 needs to detect a low temperature which is close to −50 degrees Celsius. Thus, for example, a standard thermistor having a general operation temperature range may be used as the room temperature sensor 26, and a thermistor which is excellent in measurement under a low-temperature environment may be used as the temperature sensor 24.

In FIG. 12, the temperature sensor 24 is positioned at a height level substantially equal to that of the connection portion G in the upper-and-lower direction. However, the position of the temperature sensor 24 is not limited to that position. As in Embodiment 2, the temperature sensor 24 may be positioned between the electrical component unit 9 and the connection portion G in the upper-and-lower direction, and the signal line 24a may be shortened to simplify the routing thereof.

Embodiment 4

Figure 13:
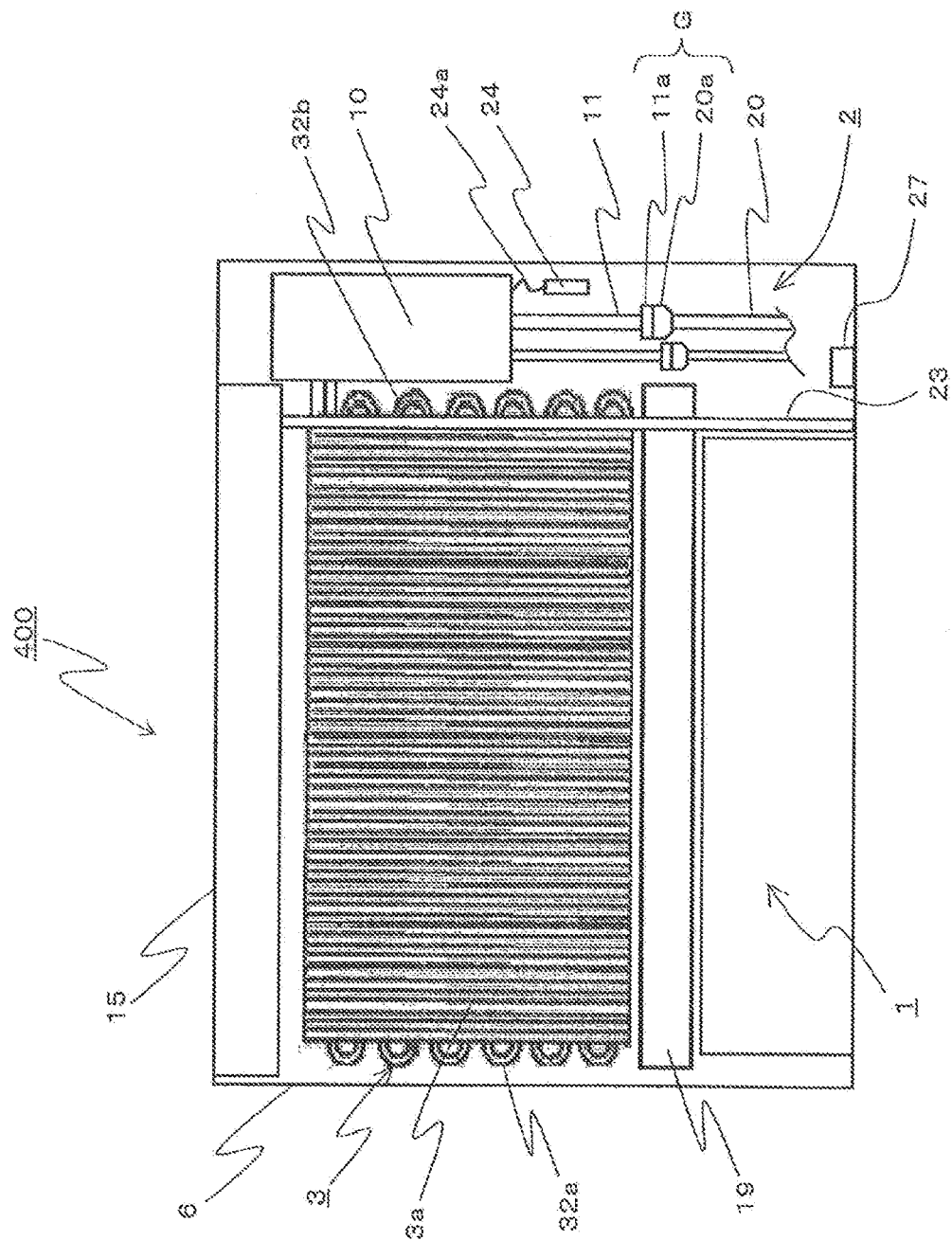
FIG. 13 is a schematic view for illustrating a state in which a front side portion of an indoor unit for an air-conditioning apparatus according to Embodiment 4 of this invention is removed, as viewed from a front side.

Next, description is made of Embodiment 4 of this invention with reference to the drawings. A basic configuration of an indoor unit 400 for an air-conditioning apparatus according to Embodiment 4 (hereinafter referred to as "indoor unit 400") is the same as that of the indoor unit 100 according to Embodiment 1. The same components are denoted by the same reference symbols, and detailed description thereof is omitted. An external perspective view of the indoor unit 400 is the same as that of the indoor unit 100, and FIG. 1 is referred. FIG. 13 is a schematic view, which corresponds to FIG. 5 of Embodiment 1, for illustrating a state in which the front-side casing 7 and other components of the indoor unit 400 according to Embodiment 4 are removed, as viewed from a front side.

As illustrated in FIG. 13, the indoor unit 400 has a feature in that a refrigerant sensor 27 configured to detect the refrigerant is provided in the pipe chamber 2 in addition to the temperature sensor 24 configured to detect the temperature T of the pipe chamber 2 to be used by the controller 10 so as to detect occurrence of the fast leakage of refrigerant in the pipe chamber 2. Herein, a semiconductor-type gas sensor configured to detect occurrence of a change in resistance value when a metal oxide semiconductor is exposed to the refrigerant gas as a refrigerant gas concentration in air is used as the refrigerant sensor 27, and the refrigerant sensor 27 is connected to the electric board in the electrical component unit 9 via a signal line (not shown).

Similarly to Embodiment 1, the temperature sensor 24 is configured to capture the temperature T of the pipe chamber 2, which abruptly changes through evaporation of the leaked refrigerant when the fast leakage of refrigerant occurs in the pipe chamber 2 due to, for example, the release of the flare connection at the connection portion G. Then, based on the temperature T of the pipe chamber 2, the controller 10 performs any one of the control flows illustrated in FIG. 6 to FIG. 9 to detect occurrence of the fast leakage of refrigerant. Incidentally, in the indoor unit for an air-conditioning apparatus, there may occur the mild leakage, which is so-called slow leakage, like the leakage through a pin hole of the heat transfer tube 32 of the heat exchanger 3 or of the communication pipe 11 with a small leakage rate, unlike the fast leakage of refrigerant caused by, such as, the release of connection at the connection portion G.

As described above, during such slow leakage of refrigerant, even when part of the leaked refrigerant gas flows out to the indoor space through the air inlet 12 formed in the lower portion of the casing 5 without stagnating in the drain pan 19 or other parts, the indoor outflow rate thereof is smaller than the natural diffusion rate in the indoor space. Thus, the refrigerant having flowed out does not stagnate, and hence the refrigerant gas concentration is less liable to rise to the flammable range. That is, formation of the gas atmosphere having the flammable concentration of the leaked refrigerant in the indoor space is less liable to occur.

Further, even when the slow leakage of refrigerant occurs in the pipe chamber 2 due to, for example, formation of a pin hole in the U-bend 32b, and part of the leaked refrigerant gas flows to the heat exchanger chamber 1 along the drain pan 19 to flow out through the air inlet 12 formed in the lower portion of the casing 5 to the indoor space, the indoor outflow rate of the refrigerant is similarly smaller than the natural diffusion rate in the indoor space. Thus, the gas atmosphere of the leaked refrigerant having the flammable concentration is less liable to be formed in the indoor space.

However, even in the case of the slow leakage, occurrence of the leakage of refrigerant may eventually lead to shortage of the refrigerant in the refrigerant circuit, with the result that degradation in performance such as insufficient cooling or heating during operation may become apparent. In such a case, operation efficiency is also degraded, and power consumption is increased. Therefore, even in the case of the slow leakage, a user would like to recognize the leakage of refrigerant in an early stage and make a suitable measure. Herein, the suitable measure is to contact a service worker to request repair of the location of leakage and filling of the refrigerant in the refrigerant circuit to a suitable amount of refrigerant.

Therefore, it is desired that the controller 10 detect the slow leakage of refrigerant before a user feels that cooling or heating is insufficient and that the controller 10 notify the user of the slow leakage. However, when the leakage of refrigerant is the slow leakage with a small leakage rate like the leakage through a pin hole of the heat transfer tube 32, as in the case of the fast leakage of refrigerant due to the release of the flare connection, the phenomenon of the abrupt fall of the temperature T of the pipe chamber 2 does not occur. Therefore, it is difficult to detect the slow leakage of refrigerant based on the temperature T of the pipe chamber 2 measured by the temperature sensor 24. Accordingly, in the indoor unit 400, the refrigerant sensor 27 is also provided in the pipe chamber 2 so that the slow leakage of refrigerant can be detected.

During both operation and non-operation of the indoor unit 400, the controller 10 captures a refrigerant gas concentration D measured by the refrigerant sensor 27 and repeats determination of whether or not the captured latest refrigerant gas concentration D is equal to or more than a predetermined determination reference concentration Dj. When D≥Dj is given, the controller 10 determines that the leakage of refrigerant is occurring and gives an alert to notify the user. The alert is similar to that of Embodiment 1. The controller 10 may determine that the leakage of refrigerant is occurring when the state of D≥Dj continues for a predetermined time period (for example, 3 seconds).

The refrigerant sensor 27 used herein is the semiconductor-type gas sensor. However, a sensor of an infrared ray type or other detection type may be used. Further, a sensor of a type which is not capable of measuring the refrigerant gas concentration D but is capable of detecting the presence or absence of the refrigerant gas may be used. In the case of using the sensor of such type, when the controller 10 receives a signal indicating the detection of the presence of the refrigerant gas from the refrigerant sensor 27, the controller 10 determines that the leakage of refrigerant is occurring, and gives an alert.

Further, an oxygen concentration meter may be used as the refrigerant sensor 27. With the phenomenon in which the presence of the leaked refrigerant gas lowers the oxygen concentration of the pipe chamber 2, when the controller 10 determines that the oxygen concentration measured by the oxygen concentration meter is equal to or less than a predetermined determination reference oxygen concentration, the controller 10 may determine that the leakage of refrigerant is occurring, and give an alert. In any of those cases, when such a condition continues for a predetermined time period (for example, 3 seconds), the controller 10 may determine that the leakage of refrigerant is occurring.

The refrigerant sensor 27 is arranged in the pipe chamber 2. However, even when the slow leakage of refrigerant occurs in the heat exchanger chamber 1, the leaked refrigerant gas is guided to the pipe chamber 2 along the drain pan 19, and hence the leaked refrigerant gas can be detected by the refrigerant sensor 27 provided in the pipe chamber 2. As described above, during the slow leakage of refrigerant, the gas atmosphere of the refrigerant having the flammable concentration is less liable to be formed around the indoor unit 400 in the indoor space. Therefore, there is no need to detect the leakage within several seconds as in the case of the fast leakage of refrigerant caused by, such as, the release of the flare connection at the connection portion G.

The refrigerant gas is heavier than air. Thus, it is preferred that the refrigerant sensor 27 be arranged in the lower portion of the pipe chamber 2. Further, in order to detect the slow leakage of refrigerant which may occur in the heat exchanger chamber 1, it is preferred that the refrigerant sensor 27 be arranged near the drain pan 19. Accordingly, the lower portion of the pipe chamber 2 herein corresponds to a portion below the upper surface height of the drain pan 19. In the indoor unit 400, the refrigerant sensor 27 is fixed to the bottom surface of the pipe chamber 2 so that a right end of the drain pan 19 and a left end of the refrigerant sensor 27 in the right-and-left direction are substantially aligned on a vertical line.

In Embodiment 4, as illustrated in Embodiment 1, the fast leakage of refrigerant which may occur in the pipe chamber 2 caused by, such as, the release of connection at the connection portion G is quickly detected based on the temperature T of the pipe chamber 2 measured by the temperature sensor 24 arranged in the pipe chamber 2, and the slow leakage of refrigerant like the leakage through a pin hole formed in the heat transfer tube 32 or the communication pipe 11 can also be detected in an early stage by the refrigerant sensor 27 arranged in the pipe chamber 2. Therefore, the indoor unit 400 according to Embodiment 4 is excellent in safety, and is capable of preventing operation under a state in which the refrigerant in the refrigerant circuit is insufficient, thereby being capable of suppressing increase in power consumption.

As in Embodiment 2, the ventilation port 25 may be formed near the temperature sensor 24 in the casing 5 (see FIG. 10) so that the temperature sensor 24 may be used for detection of the occurrence of the fast leakage of refrigerant in the pipe chamber 2. Further, during the normal operation of the indoor unit 400, the temperature sensor 24 may be used for measurement of the current temperature Tr.

Further, both the temperature sensor 24 in the pipe chamber 2 and the refrigerant sensor 27 in the pipe chamber 2 may be used as the refrigerant leakage detection sensor, and the controller 10 may determine whether or not the leakage of refrigerant occurs based on detection results of both. That is, for detection of occurrence of the fast leakage of refrigerant in the pipe chamber 2, the controller 10 may determine that the fast leakage of refrigerant occurs when both the determination based on the temperature T of the pipe chamber 2 measured by the temperature sensor 24 (any of FIG. 6 to FIG. 9) and the determination based on the measurement result of the refrigerant sensor 27 in the pipe chamber 2 are satisfied, thereby improving the detection accuracy for the leakage of refrigerant.

An oxygen-free copper pipe having high corrosion resistance is used as a material of the heat transfer tube 32 of the heat exchanger 3 so that a pin hole is less liable to be formed in the heat transfer tube 32. In particular, in the air-conditioning apparatus having the refrigerant circuit filled with the flammable refrigerant, it is desired that the oxygen-free copper pipe be used for the heat transfer tube 32 of the heat exchanger 3 so as to avoid occurrence of the slow leakage of refrigerant as much as possible and improve the safety.

Embodiment 5

Figure 14:
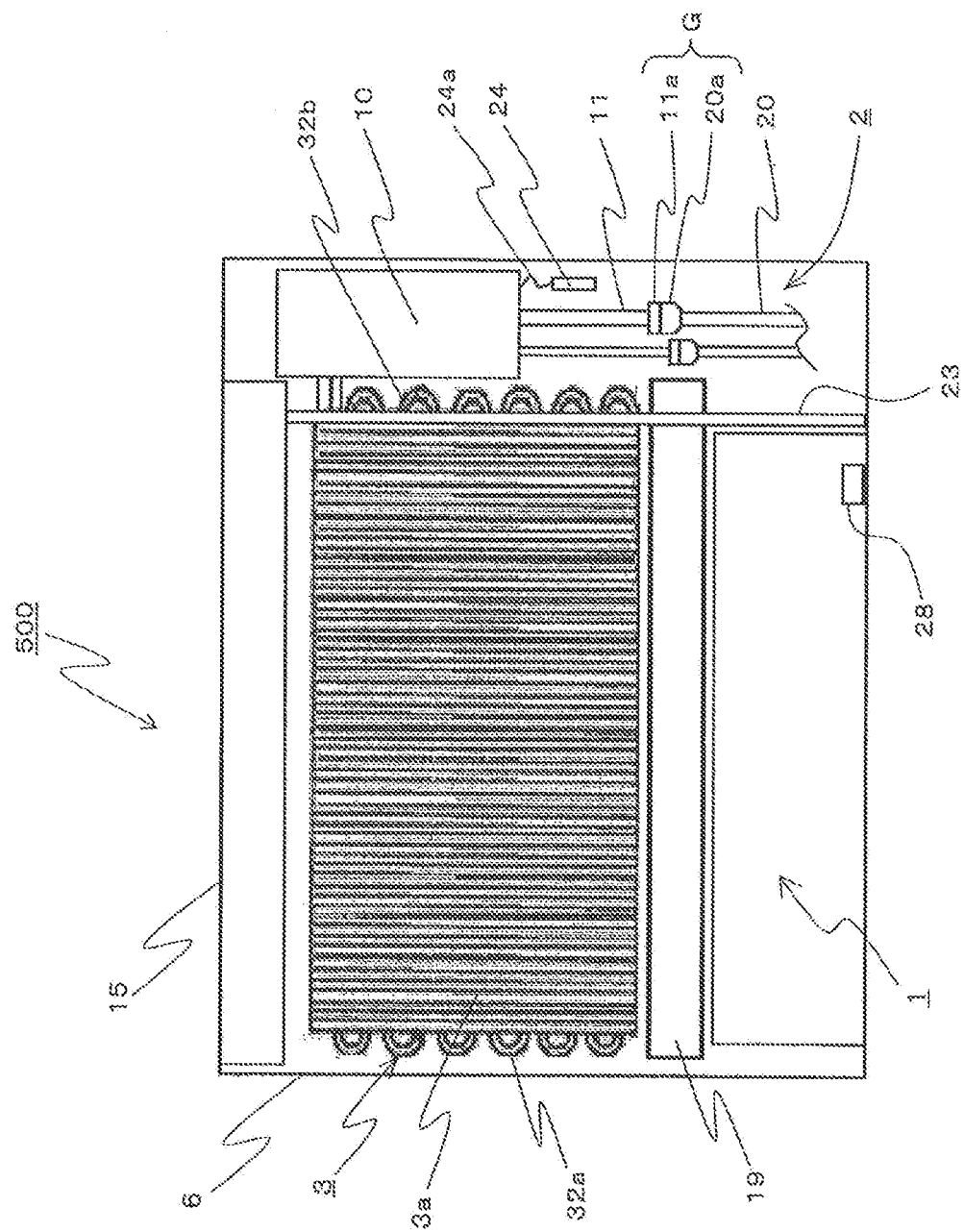
FIG. 14 is a schematic view for illustrating a state in which a front side portion of an indoor unit for an air-conditioning apparatus according to Embodiment 5 of this invention is removed, as viewed from a front side.

Next, description is made of Embodiment 5 of this invention with reference to the drawings. A basic configuration of an indoor unit 500 for an air-conditioning apparatus according to Embodiment 5 (hereinafter referred to as "indoor unit 500") is the same as that of the indoor unit 100 according to Embodiment 1. The same components are denoted by the same reference symbols, and detailed description thereof is omitted. An external perspective view of the indoor unit 500 is the same as that of the indoor unit 100, and FIG. 1 is referred. FIG. 14 is a schematic view, which corresponds to FIG. 5 of Embodiment 1, for illustrating a state in which the front-side casing 7 and other components of the indoor unit 500 according to Embodiment 5 are removed, as viewed from a front side.

As illustrated in FIG. 14, in addition to the feature in that the temperature sensor 24 configured to measure the temperature T of the pipe chamber 2 is arranged in the pipe chamber 2, the indoor unit 500 has a feature in that a refrigerant sensor 28 configured to detect the refrigerant is provided in the heat exchanger chamber 1. The refrigerant sensor 28 is provided at a location different from that of the refrigerant sensor 27 of Embodiment 4. Herein, a semiconductor-type gas sensor, which is configured to detect occurrence of a change in resistance value when a metal oxide semiconductor is exposed to the refrigerant gas as a refrigerant gas concentration in air, is used as the refrigerant sensor 28. However, as long as the refrigerant gas concentration can be measured, a sensor of another type such as an infrared type may be used.

In the indoor unit 500, the refrigerant sensor 28 is positioned in the air passage for air flow from the air inlet 12 to the air outlet 13, which is generated by the air-sending fan 4. The air inlet 12 is formed in the lower portion of the casing 5. Specifically, the refrigerant sensor 28 is fixed to the bottom surface of the heat exchanger chamber 1 on a back surface side of the air inlet 12 in the heat exchanger chamber 1. The refrigerant sensor 28 faces the air inlet 12 in the front-and-back direction. The refrigerant sensor 27 is positioned in the lower portion of the heat exchanger chamber 1 in the air passage for air flow from the air inlet 12 to the air outlet 13.

The refrigerant sensor 28 may be provided at a position on any one of upstream and downstream of the air filter 21. It is desired that the refrigerant sensor 28 be provided on downstream of the air filter 21 so that, when a user mounts or removes the air filter 21 for cleaning, the mounting or removing operation is not bothered. A signal line (not shown) of the refrigerant sensor 28 enters the pipe chamber 2 through a cutout portion formed in the partition plate 23 so as to allow the drain pan 19 to pass therethrough, and is routed to the electrical component unit 9.

In the indoor unit 500, as illustrated in Embodiment 1, the fast leakage of refrigerant which may occur in the pipe chamber 2 caused by, such as, the release of connection at the connection portion G is quickly detected based on the temperature T of the pipe chamber 2 measured by the temperature sensor 24 arranged in the pipe chamber 2, and the slow leakage of refrigerant like the leakage through a pin hole formed in the heat transfer tube 32 or the communication pipe 11 can be detected by the refrigerant sensor 28 as in the indoor unit 400 of Embodiment 4.

However, in the indoor unit 500, the indoor air sucked through the air inlet 12 passes through the refrigerant sensor 28 during rotation of the air-sending fan 4. When the controller 10 detects the occurrence of the fast leakage of refrigerant in the pipe chamber 2 as illustrated in Embodiment 1, as indicated by Step S5 or Step S7 of the control flowcharts of FIG. 6 to FIG. 9, the air-sending fan 4 is rotated at the maximum rotation speed in order to forcibly and widely diffuse the leaked refrigerant gas in the indoor space. The air flow generated during the rotation also passes through the refrigerant sensor 28 provided in the air passage.

Figure 15:
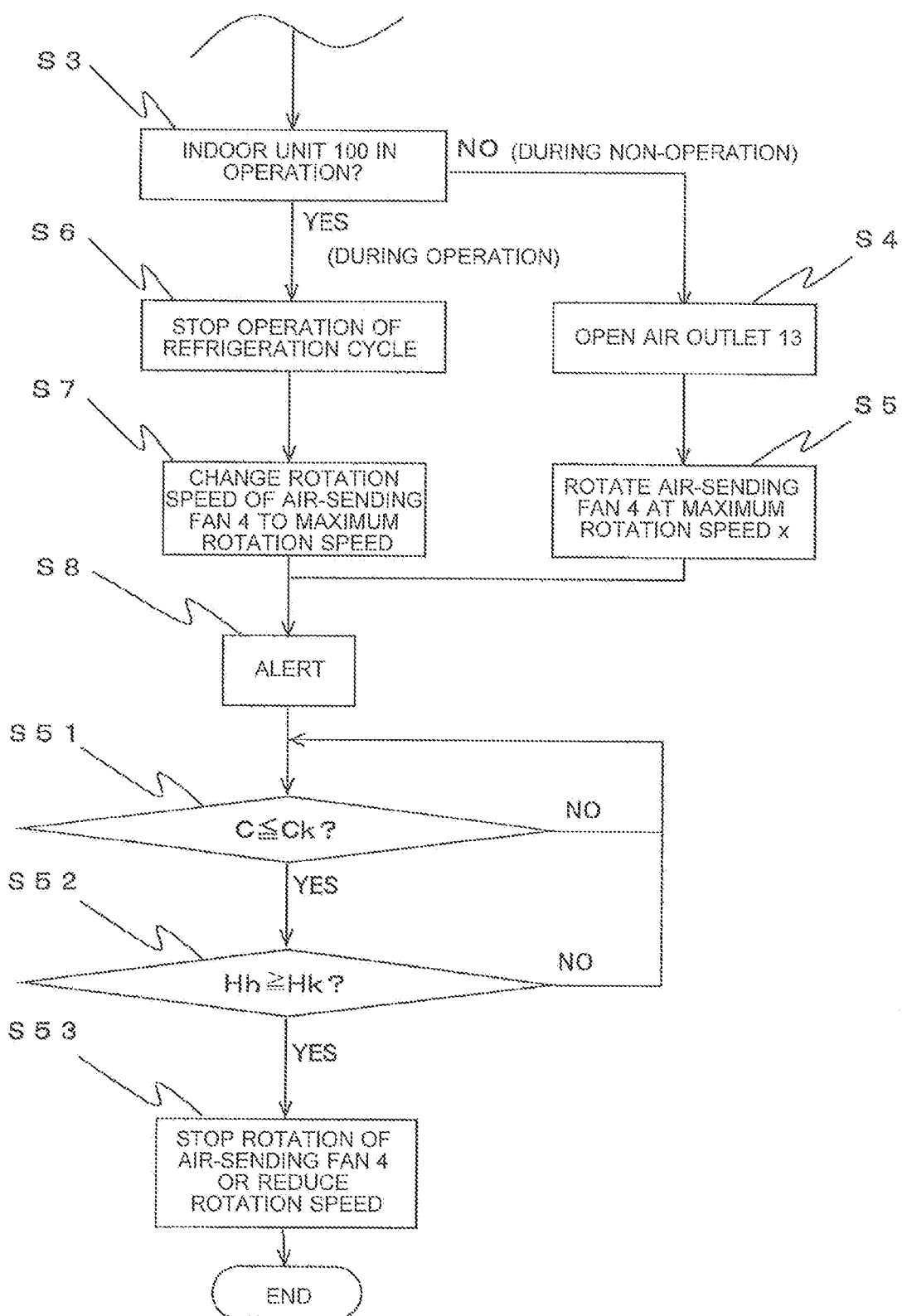
FIG. 15 is a control flowchart for the indoor unit for an air-conditioning apparatus illustrated in FIG. 14.

Thus, in the indoor unit 500, when the air-sending fan 4 is rotated at the maximum rotation speed as shown in Step S5 or Step S7 when the leakage of refrigerant is detected, a control with use of the detection value of the refrigerant sensor 28 is executed. FIG. 15 is a control flowchart for the indoor unit 500, for illustrating steps subsequent to Step S8. The flow before Step S8 is the same as those of any one of FIG. 6 to FIG. 9, and Step S3 to Step S8 are in common.

Under a state in which the air-sending fan 4 is rotated at the maximum rotation speed so as to diffuse the leaked refrigerant gas as shown in Step S5 or Step S7, the controller 10 determines in Step S51 whether or not a refrigerant gas concentration C measured in the air passage by the refrigerant sensor 28 in the lower portion of the heat exchanger chamber 1 is equal to or less than a predetermined determination reference concentration Ck. The determination reference concentration Ck has a value which is equal to or less than the determination reference concentration Dj (which is described in Embodiment 4) applied to the result of detection by the refrigerant sensor 27 used for detection of the leakage of refrigerant in the pipe chamber 2. That is, Ck≤Dj is given. At this time, the refrigerant sensor 28 measures the refrigerant gas concentration C of the indoor air sucked through the air inlet 12 into the casing 5.

When C>Ck is given (NO in the determination of Step S51), Step S51 is repeated. When C≤Ck is given (YES in the determination of Step S51), the controller 10 determines in next Step S52 whether or not a time period Hh under the state of C≤Ck is equal to or more than a predetermined reference time period Hk. When C>Ck is given within a period less than the reference time period Hk (NO in the determination of Step S52), the routine returns to the determination of Step S51.

When it is determined in Step S52 that the state of C≤Ck continues for at least the time period Hk, that is, Hh≥Hk is given (YES in the determination of Step S52), the controller 10 determines that the leaked refrigerant gas is sufficiently diffused so that the fear of formation of the gas atmosphere of the refrigerant having the flammable concentration in the indoor space is eliminated. Then, in Step S53, the controller 10 stops the rotation of the air-sending fan 4 or reduces the rotation speed of the air-sending fan 4. This is because the diffused refrigerant does not naturally aggregate. Reducing the rotation speed means that, for example, the maximum rotation speed is changed to the minimum rotation speed.

When the refrigerant gas concentration C to be detected by the refrigerant sensor 28 is to be used only for the determination in Step S51 and Step S52 described above, the refrigerant sensor 28 may be provided at any position in the air passage for air flow from the air inlet 12 to the air outlet 13. Operation of the refrigeration cycle is stopped, and hence the indoor air including the leaked refrigerant gas sucked through the air inlet 12 is not subjected to heat exchange in the heat exchanger 3.

However, as in Embodiment 4, the refrigerant sensor 28 is used also for detection of the slow leakage of refrigerant like the leakage through a pin hole of the heat transfer tube 32 regardless of during operation or non-operation. To detect the slow leakage of refrigerant as early as possible with high accuracy, it is preferred that the refrigerant sensor 28 be positioned on the lower side in the air passage in consideration of the characteristic of the refrigerant gas being heavier than air.

In the indoor unit 500, the refrigerant sensor 28 is provided in a lower portion of the heat exchanger chamber 1 in the air passage for air flow from the air inlet 12 to the air outlet 13. However, the slow leakage of refrigerant through a pin hole occurs with high frequency in the heat transfer tube 32 of the heat exchanger 3, and hence the lower portion of the heat exchanger chamber 1 corresponds to a position at least below the heat exchanger 3 in the upper-and-lower direction.

However, when the refrigerant sensor 28 is positioned above the upper surface opening of the drain pan 19, the air flow generated by the air-sending fan 4 does not pass through the refrigerant sensor 28, with the result that there is difficulty in performing the determination of Step S51 described above. Further, when the refrigerant sensor 28 is fixed to a lower surface of the drain pan 19, the refrigerant gas under the slow leakage during the non-operation is prevented from flowing around to the lower surface side of the drain pan 19, with the result that there is difficulty in detection of the slow leakage of refrigerant. It is preferred that the refrigerant sensor 28 be prevented from being arranged close to the drain pan 19 in the upper-and-lower direction. When the drain pan 19 and the refrigerant sensor 28 overlap with each other in the upper-and-lower direction, it is preferred that a clearance equal to or more than 30 mm be formed therebetween.

In Embodiment 5, the temperature sensor 24 configured to measure the temperature T of the pipe chamber 2 is provided in the pipe chamber 2, and the refrigerant sensor 28 is arranged in the lower portion of the heat exchanger chamber 1 in the air passage which allows the air flow generated by the air-sending fan 4 to flow threrethough. Therefore, in addition to the actions and effects of Embodiment 4, determination on whether or not the rotation of the air-sending fan 4 being rotated at the maximum rotation speed may be stopped or reduced in rotation speed in order to diffuse the leaked refrigerant gas after the detection of the fast leakage of refrigerant can be performed based on the measurement result of the refrigerant sensor 28 with respect to the indoor air sucked through the air inlet 12.

When the rotation of the air-sending fan 4 is stopped or reduced in rotation speed based on the determination result, unnecessary rotation of the air-sending fan 4 can be avoided while securing the safety. Therefore, a user in the indoor space is prevented from having a feeling of discomfort due to a large amount of air flow which is sent out from the air-sending fan 4 being rotated at the maximum rotation speed and strikes against the body of the user, or is prevented from being annoyed by noise such as an air flow sound or electric machine sound caused by the high-speed rotation of the air-sending fan 4. Further, unnecessary driving of the air-sending fan 4 is avoided, thereby being capable of suppressing the amount of power consumption.

As described above, in the indoor unit 500, the leakage of refrigerant is detected by the temperature sensor 24, and the air-sending fan 4 is rotated at high rotation speed so as to diffuse the leaked refrigerant. The air-sending fan 4 is prevented from being continuously rotated at the high rotation speed. The refrigerant gas concentration C of the indoor air sucked through the air inlet 3 into the casing 5 is grasped by the refrigerant sensor 28. When the given concentration may lead to the determination that the refrigerant is sufficiently diffused, that is, when the refrigerant gas concentration C is equal to or less than the predetermined determination reference concentration Ck, a control is executed to stop the air-sending fan 4 or reduce the rotation speed of the air-sending fan 4. Therefore, the indoor unit 500 is capable of securing the safety through diffusion of the leaked refrigerant and avoiding the feeling of discomfort to the user caused by the high-speed rotation of the air-sending fan 4 for the diffusion of refrigerant.

When the rotation of the air-sending fan 4 at the maximum rotation speed is started by Step S5 or Step S7, the rotation of the air-sending fan 4 at the maximum rotation speed continues for a predetermined time period (for example, 5 minutes) regardless of the measurement result of the refrigerant sensor 28. After an elapse of the predetermined time period, the control flow subsequent to Step S51 is performed to improve the safety. In any of those cases, the controller 10 executes the control of stopping the rotation of the air-sending fan or reducing the rotation speed of the rotation in accordance with the result of detection by the refrigerant sensor 28 in the heat exchanger chamber 1.

Also in Embodiment 5, similarly to Embodiment 2, the ventilation port 25 is formed in the casing 5 at a position near the temperature sensor 24 (see FIG. 10), and the temperature sensor 24 may be used for detection of the occurrence of the fast leakage of refrigerant in the pipe chamber 2 and for measurement of the current room temperature Tr during the normal operation of the indoor unit 500.

Further, the right-side end portion of the drain pan 19 passes through the cutout portion formed in the partition plate 23 to enter the pipe chamber 2. Thus, when the fast leakage of refrigerant caused by, such as, the release of connection at the connection portion G in the pipe chamber 2 occurs, the leaked refrigerant gas evaporated in the pipe chamber 2 is pushed out from the pipe chamber 2 and flows into the heat exchanger chamber 1 along the upper surface opening of the drain pan 19. Therefore, the leaked refrigerant flowing into the heat exchanger chamber 1 in such a manner can be detected by the refrigerant sensor 28 in the lower portion of the heat exchanger chamber 1.

Accordingly, the fast leakage of refrigerant which may occur in the pipe chamber 2 can be detected through use of the refrigerant sensor 28 in the lower portion of the heat exchanger chamber 1. Therefore, through use of both the temperature sensor 24 in the pipe chamber 2 and the refrigerant sensor 28 in the heat exchanger chamber 1 as the refrigerant leakage detection sensor, the controller 10 may determine whether or not the leakage of refrigerant occurs based on detection results of both. That is, for the detection of the occurrence of the fast leakage of refrigerant in the pipe chamber 2, when the determination based on the temperature T of the pipe chamber 2 measured by the temperature sensor 24 (any one of FIG. 6 to FIG. 9) and the determination based on the measurement result of the refrigerant sensor 28 in the heat exchanger chamber 1 are satisfied, the controller 10 may determine that the leakage of refrigerant is occurring, thereby further improving the detection accuracy for the leakage of refrigerant.

The indoor unit 500 has a configuration including the air inlet 12 formed in the lower portion of the casing 5 and the air outlet 13 formed above the air inlet 12. However, in a configuration including the air outlet 13 positioned below the air inlet 12, the refrigerant sensor 28 may be provided at a position facing the air outlet 13. It is only necessary that the refrigerant sensor 28 be provided at a position below the heat exchanger 3 in the heat exchanger chamber 1 in the air passage from the air inlet 12 to the air outlet 13.

Embodiment 6

Figure 16:
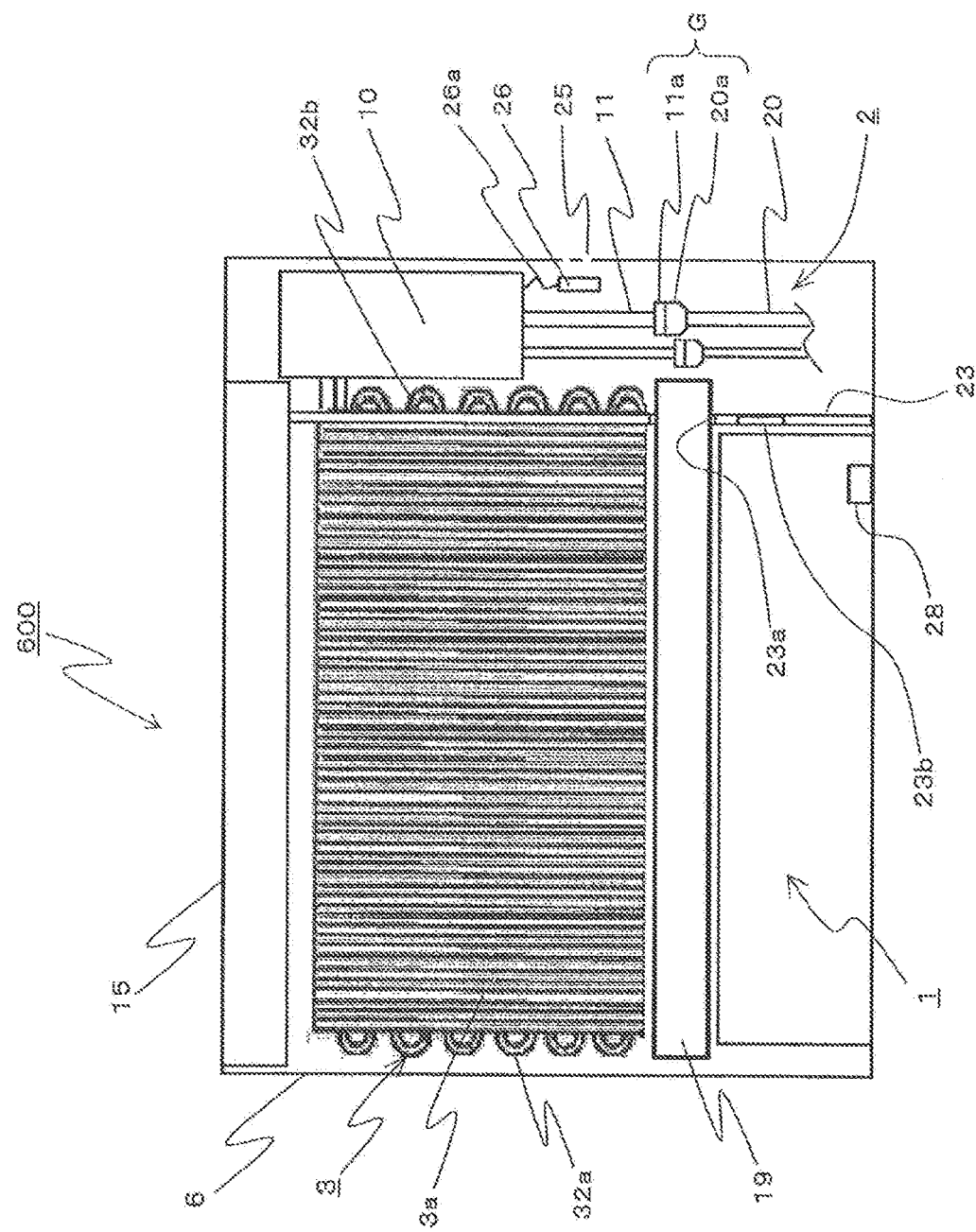
FIG. 16 is a schematic view for illustrating a state in which a front side portion of an indoor unit for an air-conditioning apparatus according to Embodiment 6 of this invention is removed, as viewed from a front side.

Next, description is made of Embodiment 6 of this invention with reference to the drawings. FIG. 16 is a schematic view for illustrating a state in which the front-side casing 7 and other components of an indoor unit 600 for an air-conditioning apparatus according to Embodiment 6 (hereinafter referred to as "indoor unit 600") are removed, as viewed from a front side. Components which are the same as those of the indoor units according to Embodiment 1 to Embodiment 5 described above are denoted by the same reference symbols, and detailed description thereof is omitted. An external perspective view of the indoor unit 600 is the same as that of the indoor unit 200 illustrated in FIG. 10, and FIG. 10 is referred.

In the indoor unit 600, a sensor configured to detect leakage of refrigerant is not provided in the pipe chamber 2. As illustrated in FIG. 16, the room temperature sensor 26 is provided in the pipe chamber 2 so as to be opposed to the ventilation port 25 formed in a side surface of the casing 5. However, a measurement value of the room temperature sensor 26 is handled by the controller 10 as the current room temperature Tr, and is used for the rotation speed control for the compressor during normal operation or for other uses. The controller 10 does not perform the determination on whether or not the leakage of refrigerant occurs in accordance with the measurement value of the room temperature sensor 26. Further, the refrigerant sensor configured to detect the refrigerant is not provided in the pipe chamber 2.

Meanwhile, the refrigerant sensor 28 configured to detect the refrigerant is provided in the heat exchanger chamber 1. A position of the refrigerant sensor 28 in the heat exchanger chamber 1, routing of the signal line of the refrigerant sensor 28, and a method of detecting the refrigerant gas concentration are the same as those of the indoor unit 500 according to Embodiment 5, and description thereof is omitted.

Further, the right-side end portion of the drain pan 19 passes through the cutout portion 23a of the partition plate 23 to enter the pipe chamber 2. Similarly to Embodiment 1 to Embodiment 5 described above, the pipe chamber 2 and the heat exchanger chamber 1 are capable of communicating air therebetween through the upper surface opening of the drain pan 19.

Therefore, when the fast leakage of refrigerant such as the release of connection at the connection portion G occurs in the pipe chamber 2, the rise in pressure of the pipe chamber 2 due to evaporation of the leaked refrigerant causes the evaporated leaked refrigerant gas to flow from the pipe chamber 2 to the heat exchanger chamber 1 along the upper surface opening of the drain pan 19. Therefore, the leaked refrigerant gas flowing into the heat exchanger chamber 1 can be detected by the refrigerant sensor 28 in the lower portion of the heat exchanger chamber 1.

In the indoor unit 600, the refrigerant leakage detection sensor is not provided in the pipe chamber 2. However, as described above, the refrigerant sensor 28 in the lower portion of the heat exchanger chamber 1 in the air passage from the air inlet 12 to the air outlet 13 is capable of detecting the leaked refrigerant gas which flows from the pipe chamber 2 into the heat exchanger chamber 1. The controller 10 can detect the occurrence of leakage of refrigerant in the pipe chamber 2 based on the detection result. As described above, the refrigerant leakage detection sensor of the indoor unit 600 is the refrigerant sensor 28 in the heat exchanger chamber 1, and the controller 10 determines whether or not the leakage of refrigerant occurs based on the result of detection by the refrigerant sensor 28.

Figure 17:
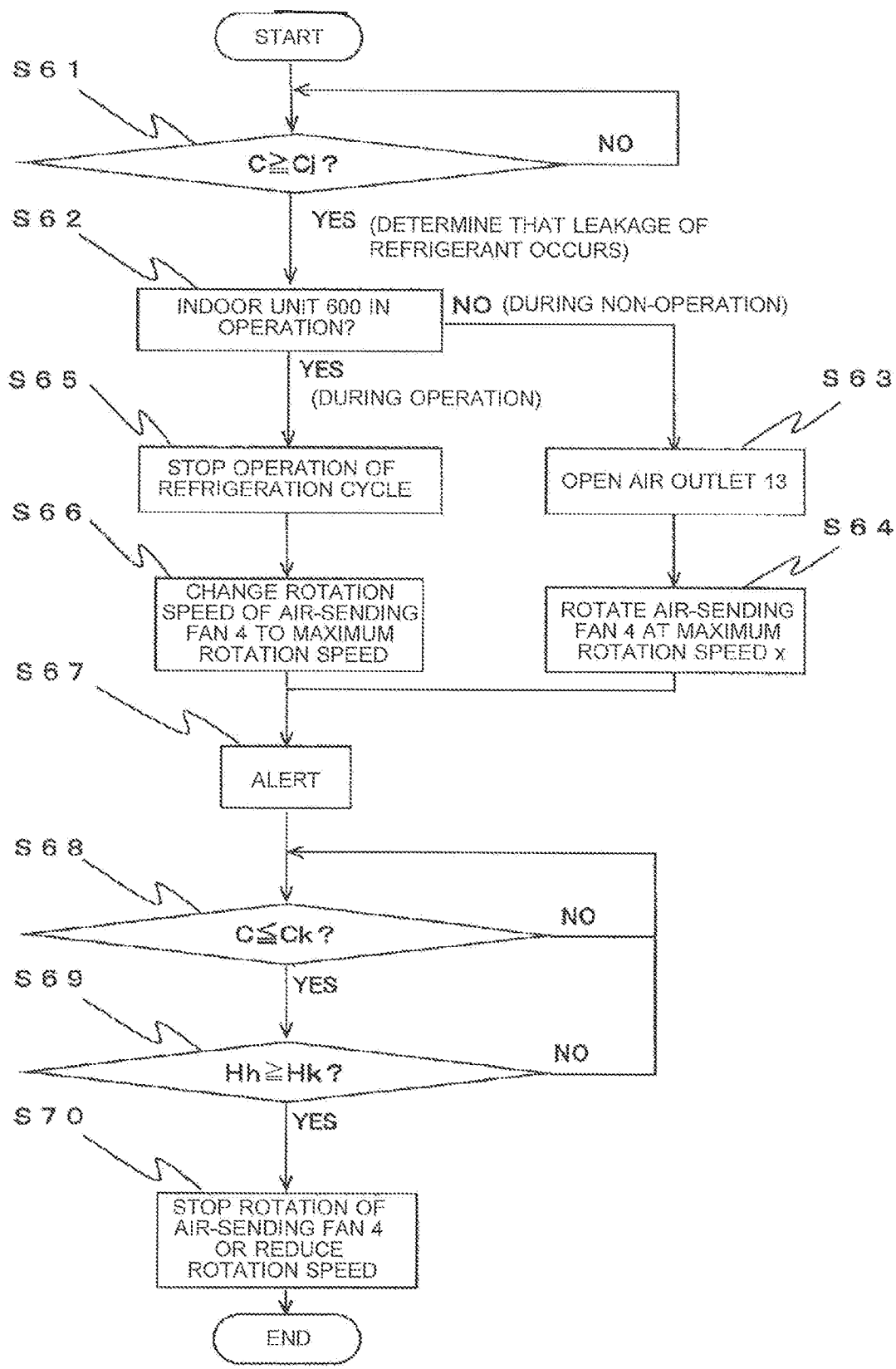
FIG. 17 is a control flowchart for the indoor unit for an air-conditioning apparatus illustrated in FIG. 16.

FIG. 17 is a control flowchart for a control executed by the controller 10 for the indoor unit 600 in relation to the leakage of refrigerant. Even during non-operation of the operation of the indoor unit 600, the controller 10 grasps the measurement result of the refrigerant sensor 28.

As illustrated in FIG. 17, in Step S61, the controller 10 determines whether or not the refrigerant gas concentration C being the measurement value of the refrigerant sensor 28 is equal to or more than the predetermined determination reference concentration Cj. When $C \geq Cj$ is given (YES in the determination of Step S61), the controller 10 determines that the leakage of refrigerant is occurring in the pipe chamber 2.

When the controller 10 determines that leakage of refrigerant occurs based on the determination result of Step S61, the controller 10 then determines whether or not the indoor unit 600 is in operation in Step S62. When the controller 10 determines that the indoor unit 600 is stopped (NO in the determination of Step S62), the controller 10 immediately controls the up-and-down wind direction plates 16 of the blowing unit 15 to turn to open the air outlet 13 in subsequent Step S63, and controls the air-sending fan 4 to rotate in Step S64. At this time, the rotation speed of the air-sending fan 4 is the presettable maximum rotation speed.

Meanwhile, when the indoor unit 600 is in operation (YES in the determination of Step S62), the air outlet 13 is in an open state, and the air-sending fan 4 is rotated. The controller 10 immediately stops the compressor of the refrigeration circuit to stop the operation of the refrigeration cycle in Step S65, and changes (increases) the rotation speed of the air-sending fan 4 to the presettable maximum rotation speed in Step S66. When the air-sending fan 4 is rotated at the maximum rotation speed, the rotation speed is maintained. During both the operation and non-operation, the controller 10 immediately gives an alert at the same time in Step S67 to notify the user of the leakage of the flammable refrigerant in the indoor space and prompt ventilation of the room.

Under a state in which the air-sending fan 4 is rotated at the maximum rotation speed so as to diffuse the leaked refrigerant gas, the controller 10 determines in Step S68 whether or not the refrigerant gas concentration C measured by the refrigerant sensor 28 is equal to or less than the predetermined determination reference concentration Ck. The determination reference concentration Ck is a value equal to or smaller than the determination reference concentration Cj used in Step S61, and $Ck \leq Cj$ is given. At this time, the refrigerant sensor 28 measures the refrigerant gas concentration C of the indoor air sucked through the air inlet 12 into the casing 5.

When $C \leq Ck$ is given in Step S68 (YES in the determination of Step S68), the controller 10 determines in next Step S69 whether or not the time period Hh in the state of $C \leq Ck$ is equal to or more than the predetermined reference time period Hk. When $C > Ck$ is given within a time period of less than the predetermined reference time period Hk (NO in the determination of Step S69), the routine returns to the determination of Step S68.

When it is determined in Step S69 that the state of $C \leq Ck$ continues for at least the time period Hk, that is, when $Hh \geq Hk$ is given (YES in the determination of Step S69), the controller 10 determines that the leaked refrigerant gas is sufficiently diffused to eliminate the fear of formation of the gas atmosphere of the refrigerant having the flammable concentration in the indoor space. Then, in Step S70, the controller 10 causes the rotation of the air-sending fan 4 to be stopped or reduced in rotation speed. Reducing the rotation speed means that, for example, the maximum rotation speed is changed to the minimum rotation speed.

As described above, in the indoor unit 600, the controller 10 uses the result of detection by the refrigerant sensor 28 not only for the determination of the presence or absence of occurrence of the leakage of refrigerant but also for the determination of whether or not the leaked refrigerant gas is sufficiently diffused after rotation of the air-sending fan 4 at the maximum rotation speed. The controller 10 detects the leakage of refrigerant in the pipe chamber 2 based on the result of detection by the refrigerant sensor 28 and controls the air-sending fan 4 to rotate at the maximum rotation speed. Then, the controller 10 controls the rotating air-sending fan 4 to be stopped or reduced in rotation speed in accordance with a result of detection by the refrigerant sensor 28. Accordingly, the safety is secured, and unnecessary rotation of the air-sending fan 4 can be avoided. Therefore, a user in the indoor space is prevented from feeling coldness due to a large amount of air flow which is sent out from the air-sending fan 4 being rotated at the maximum rotation speed and strikes against the body of the user, or is prevented from being annoyed by noise such as an air flow sound or electric machine sound caused by the high-speed rotation of the air-sending fan 4, thereby avoiding a feeling of discomfort to the user.

In the indoor unit 600, the leakage of refrigerant is detected by the refrigerant sensor 28 positioned in the lower portion of the heat exchanger chamber 1, and the air-sending fan 4 rotated at the high rotation speed so as to diffuse the leaked refrigerant is prevented from continuing the rotation at the high rotation speed. The refrigerant gas concentration C of the indoor air sucked through the air inlet 12 into the casing 5 is grasped by the refrigerant sensor 28. When the given concentration may lead to the determination that the refrigerant is sufficiently diffused, that is, when the concentration is equal to or less than the predetermined determination reference concentration Ck, a control is executed to stop the air-sending fan 4 or reduce the rotation speed of the air-sending fan 4. Therefore, the indoor unit 600 is capable of securing the safety through diffusion of the leaked refrigerant and avoiding the feeling of discomfort to the user caused by the high-speed rotation of the air-sending fan 4 for the diffusion of refrigerant.

The leaked refrigerant gas flows from the pipe chamber 2 to the heat exchanger chamber 1 along the drain pan 19, and the refrigerant gas is heavier than air. Thus, the lower portion of the heat exchanger chamber 1 of the indoor unit 600 in which the refrigerant sensor 28 is positioned is a position below the drain pan 19 in the upper-and-lower direction.

Embodiment 7

Figure 18:
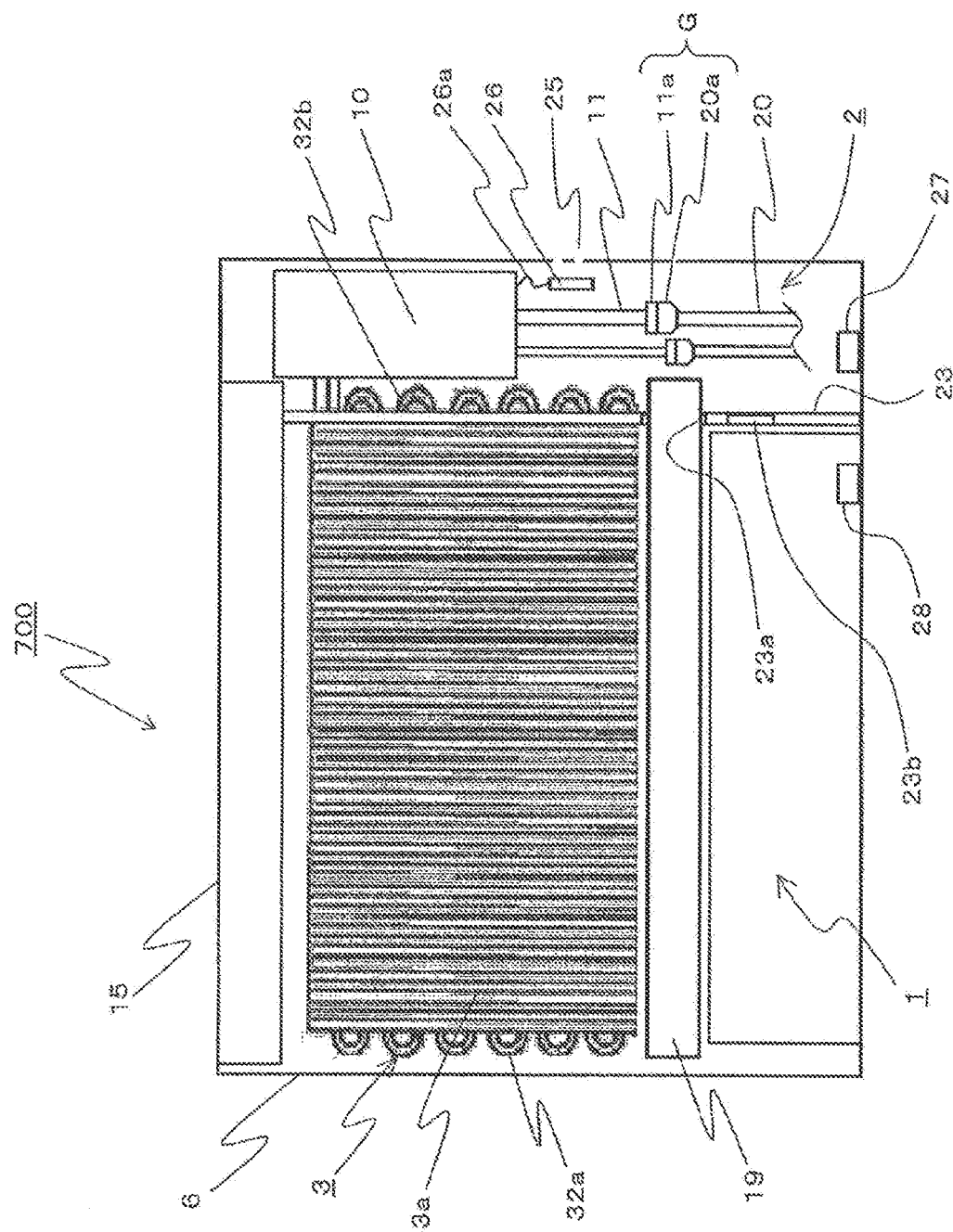
FIG. 18 is a schematic view for illustrating a state in which a front side portion of an indoor unit for an air-conditioning apparatus according to Embodiment 7 of this invention is removed, as viewed from a front side.

Next, description is made of Embodiment 7 of this invention with reference to the drawings. FIG. 18 is a schematic view for illustrating a state in which the front-side casing 7 and other components of an indoor unit 700 for an air-conditioning apparatus according to Embodiment 7 (hereinafter referred to as "indoor unit 700") are removed, as viewed from a front side. Components which are the same as those of the indoor units according to Embodiment 1 to Embodiment 6 described above are denoted by the same reference symbols, and detailed description thereof is omitted. An external perspective view of the indoor unit 700 is the same as that of the indoor unit 200 illustrated in FIG. 10, and FIG. 10 is referred.

In the indoor unit 700, the refrigerant sensor 27 being the refrigerant leakage detection sensor is provided in the pipe chamber 2. The refrigerant sensor 27 is provided in the lower portion of the pipe chamber 2, and is connected to the electric board in the electrical component unit 9 via a signal line (not shown). In the pipe chamber 2, the room temperature sensor 26 is provided so as to be opposed to the ventilation port 25 formed in the side surface of the casing 5. However, the measurement value of the room temperature sensor 26 is handled by the controller 10 as the current room temperature Tr, and the controller 10 does not perform the determination on whether or not the leakage of refrigerant occurs in accordance with the measurement value of the room temperature sensor 26.

Further, the refrigerant sensor 28 configured to detect the refrigerant is also provided in the lower portion of the heat exchanger chamber 1. A position of the refrigerant sensor 28 in the heat exchanger chamber 1, routing of the signal line of the refrigerant sensor 28, and a method of detecting the refrigerant gas concentration are the same as those of the indoor unit 500 according to Embodiment 5 and the indoor unit 600 according to Embodiment 6, and description thereof is omitted.

The refrigerant sensor 27 in the pipe chamber 2 used herein is the semiconductor-type gas sensor which is the same as the refrigerant sensor 28 in the heat exchanger chamber 1. However, a sensor of an infrared ray type or other detection type may be used. Further, the refrigerant sensor 27 in the pipe chamber 2 may be a sensor of a type which is not capable of measuring the refrigerant gas concentration D but is capable of detecting presence or absence of the refrigerant gas. Meanwhile, the refrigerant sensor 28 in the heat exchanger chamber 1 is capable of measuring the refrigerant gas concentration C.

Figure 19:
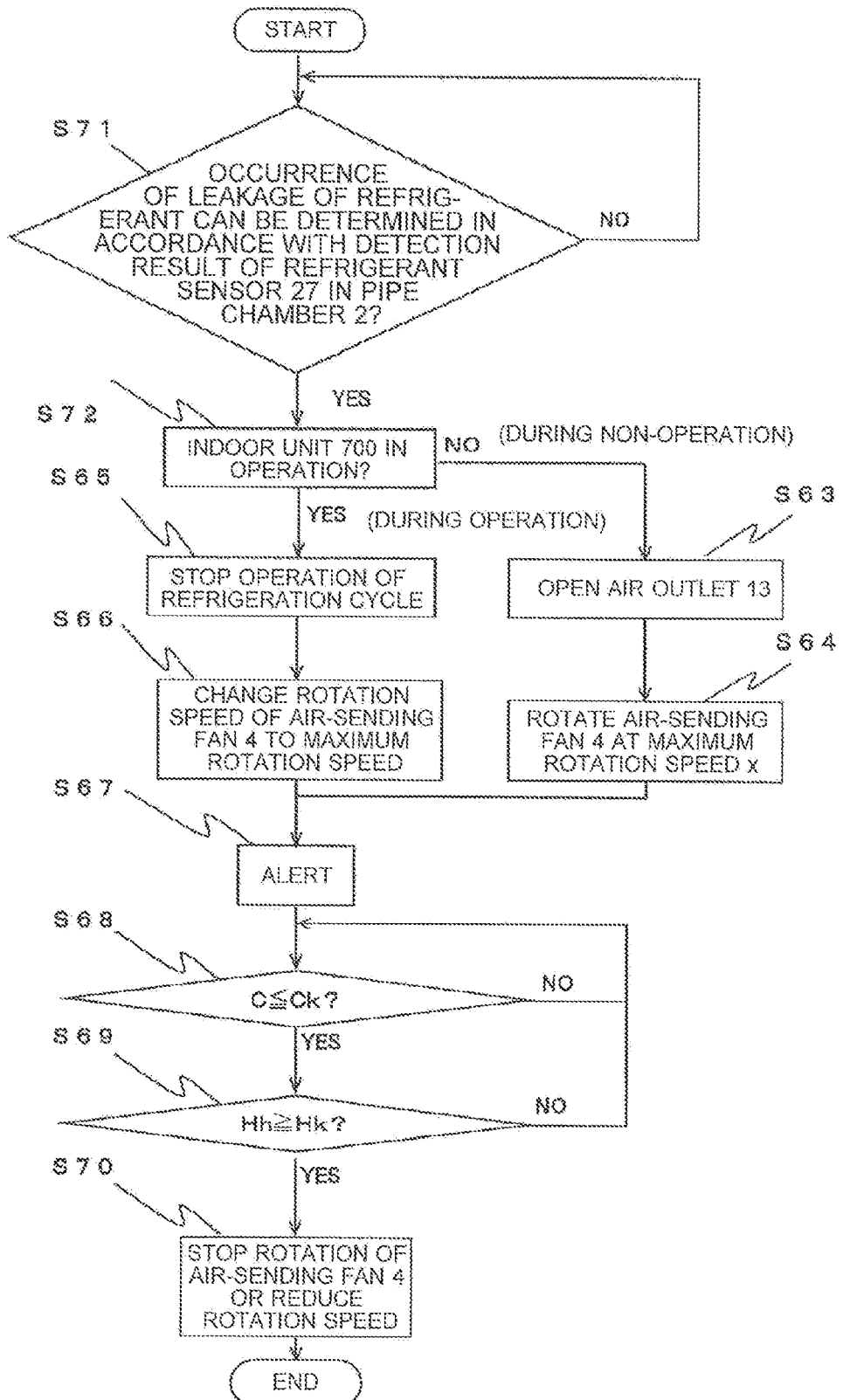
FIG. 19 is a control flowchart for the indoor unit for an air-conditioning apparatus illustrated in FIG. 18.

FIG. 19 is a control flowchart for a control executed by the controller 10 for the indoor unit 700 in relation to the leakage of refrigerant. Even during non-operation of the operation of the indoor unit 700, the controller 10 grasps at least the measurement result of the refrigerant sensor 27. The controller 10 may also grasp the measurement result of the refrigerant sensor 28 during non-operation of the operation. In the indoor unit 700, the controller 10 grasps both measurement results during the non-operation.

As illustrated in FIG. 19, in Step S71, when it can be determined that the leakage of refrigerant is occurring in the pipe chamber 2 based on the result of detection by the refrigerant sensor 27 in the pipe chamber 2, the controller 10 determines in Step S72 whether or not the indoor unit 700 is in operation. The control flow subsequent to Step S72 is the same as that of FIG. 17 (S63 to S70) of Embodiment 6, and description thereof is omitted.

Herein, with use of the refrigerant sensor 27 in the pipe chamber 2 capable of measuring the refrigerant gas concentration as in the semiconductor-type gas sensor, the controller 10 can determine in Step S71 that the leakage of refrigerant is occurring in the pipe chamber 2 when the refrigerant gas concentration D measured by the refrigerant sensor 27 is equal to or more than the predetermined determination reference concentration Dj, that is, $D \geq Dj$ is given.

Further, with use of the refrigerant gas sensor 27 which is not capable of measuring the refrigerant gas concentration but is capable of detecting only the presence or absence of the refrigerant gas, when the refrigerant sensor 27 detects the refrigerant gas in Step S71, the controller 10 can determine that the leakage of refrigerant is occurring in the pipe chamber 2. As described above, the refrigerant leakage detection sensor of the indoor unit 700 is the refrigerant sensor 27 in the pipe chamber 2, and the controller 10 determines whether or not the leakage of refrigerant occurs based on the result of detection by the refrigerant sensor 27.

In the indoor unit 700 of Embodiment 7, when the controller 10 determines that the leakage of refrigerant is occurring in accordance with the result of detection by the refrigerant sensor 27, the controller 10 controls the air-sending fan 4 to rotate. To determine whether or not the leaked refrigerant gas is sufficiently diffused during rotation of the air-sending fan 4, the controller 10 uses the refrigerant sensor 28 in the heat exchanger chamber 1 to grasp the refrigerant gas concentration C of the indoor air sucked through the air inlet 12.

As described above, in the indoor unit 700, the controller 10 detects the leakage of refrigerant in the pipe chamber 2 based on the result of detection by the refrigerant sensor 27 in the pipe chamber 2 and controls the air-sending fan 4 to rotate at the maximum rotation speed. The rotating air-sending fan 4 is stopped or reduced in rotation speed in accordance with the result of detection by the refrigerant sensor 28 in the heat exchanger chamber 1. Thus, the safety is secured, and unnecessary rotation of the air-sending fan 4 can be avoided. Therefore, a user in the indoor space is prevented from feeling coldness due to a large amount of air flow which is sent out from the air-sending fan 4 being rotated at the maximum rotation speed and strikes against the body of the user, or is prevented from being annoyed by noise such as an air flow sound or electric machine sound caused by the high-speed rotation of the air-sending fan 4, thereby avoiding the feeling of discomfort to the user.

The right-side end portion of the drain pan 19 passes through the cutout portion 23a formed in the partition plate 23 to enter the pipe chamber 2. Thus, when the fast leakage of refrigerant caused by, such as, the release of connection at the connection portion G in the pipe chamber 2 occurs, the leaked refrigerant gas evaporated in the pipe chamber 2 flows to the heat exchanger chamber 1 along the upper surface opening of the drain pan 19. Therefore, the leaked refrigerant flowing into the heat exchanger chamber 1 in such a manner can be detected by the refrigerant sensor 28 in the lower portion of the heat exchanger chamber 1.

Accordingly, the leakage of refrigerant which may occur in the pipe chamber 2 can be detected also through use of the refrigerant sensor 28 in the lower portion of the heat exchanger chamber 1. Therefore, through use of both the refrigerant sensor 27 in the pipe chamber 2 and the refrigerant sensor 28 in the heat exchanger chamber 1 as the refrigerant leakage detection sensor, the controller 10 may determine whether or not the leakage of refrigerant occurs based on the detection results of both. That is, for the detection of the occurrence of leakage of refrigerant in the pipe chamber 2, when the determination based on the measurement result of the refrigerant sensor 27 in the pipe chamber 2 and the determination based on the measurement result of the refrigerant sensor 28 in the heat exchanger chamber 1 are both satisfied, the controller 10 may determine that the leakage of refrigerant is occurring, thereby further improving the detection accuracy for the leakage of refrigerant.

In any of Embodiment 1 to Embodiment 7 described above, the right-side end portion of the drain pan 19 passes through the partition plate 23 (for example, passes through the cutout portion 23a as illustrated in FIG. 16) to enter the pipe chamber 2 so that the pipe chamber 2 and the heat exchanger chamber 1 can communicate air along the upper surface opening of the drain pan 19. When the drain pan 19 has a configuration of being accommodate only in the heat exchanger chamber 1 without extending in the pipe chamber 2, as illustrated in FIG. 16, a communication hole 23b partially communicating the pipe chamber 2 and the heat exchanger chamber 1 may be formed in the partition plate 23 to enable communication of air between the pipe chamber 2 and the heat exchanger chamber 1. Such communication hole 23b is formed at a position which enables the air flow flowing from the pipe chamber 2 to the heat exchanger chamber 1 to merge the main air flow of air sucked through the air inlet 12 on the upstream of the heat exchanger 3 and flowing to the air outlet 13.

Further, even with the configuration in which the right-side end portion of the drain pan 19 passes through the cutout portion 23a of the partition plate 23 to enter the pipe chamber 2 to enable communication of air between the pipe chamber 2 and the heat exchanger chamber 1 along the upper surface opening of the drain pan 19, the communication hole 23b may be formed in the partition plate 23 separately from the cutout portion 23a to enable easier communication of air between the pipe chamber 2 and the heat exchanger chamber 1. With such a configuration, the leakage of refrigerant gas evaporated in the pipe chamber 2 can be detected earlier by the refrigerant sensor 28 in the lower portion of the heat exchanger chamber 1. It is desired that, as illustrated in FIG. 16, the communication hole 23b in such a case be formed at a position below the cutout portion 23a allowing passage of the drain pan 19 in the upper-and-lower direction.

In any of Embodiment 1 to Embodiment 7, there is no need to clearly isolate the pipe chamber 2 and the heat exchanger chamber 1 with the partition plate 23. The heat exchanger chamber 1 corresponds to a range in which the heat exchanger 3 and the air-sending fan 4 are arranged and in which the air passage for the air flow from the air inlet 12 to the air outlet 13 generated by the rotation of the air-sending fan 4 is formed, and the pipe chamber 2 corresponds to a range which is isolated by the air passage and in which the connection portion G between the communication pipe 11 and the external connection pipe 20 is positioned.

The present invention described above with reference to Embodiment 1 to Embodiment 7 achieves an effect which is excellent particularly in the viewpoint of safety in the case of the refrigerant filled in the refrigerant circuit, which may flow out to the indoor space to form the gas atmosphere having the flammable configuration range and have the flammability including mild flammability which poses a fear of catching fire due to the presence of an ignition source. However, even when the refrigerant to be used in the refrigerant circuit is the non-flammable refrigerant (for example, R410A) which poses no fear of catching fire after the flow into the indoor space, a user is informed of the occurrence of leakage of refrigerant in an early stage. The operation in the state of being insufficient in amount of refrigerant in the refrigerant circuit which may cause, for example, the cooling operation to be prevented from cooling or being insufficient in cooling can be avoided, and a user can immediately contact a service worker to achieve repair in an early stage. Therefore, the present invention is effective even when it is applied to the case of using non-flammable refrigerant, not limited to the flammable refrigerant.

The refrigerant sensor 28 in the heat exchanger chamber 1 corresponds to a first refrigerant sensor according to the present invention, and the refrigerant sensor 27 provided in the pipe chamber 2 corresponds to a second refrigerant sensor according to the present invention.

The invention claimed is:

1. An indoor unit for an air-conditioning apparatus, the indoor unit comprising:

a casing having an air inlet and an air outlet and being configured to be installed in a room to be air-conditioned;

an air-sending fan configured to generate an air flow from the air inlet to the air outlet;

a heat exchanger forming a part of a refrigerant circuit filled with refrigerant and configured to allow the air flow generated by the air-sending fan to pass through the heat exchanger;

a heat exchanger chamber formed in the casing, configured to accommodate the air-sending fan and the heat exchanger, and communicate with the air inlet and the air outlet;

a communication pipe forming a part of the refrigerant circuit and connected to the heat exchanger;

an external connection pipe forming a part of the refrigerant circuit and introduced into the room from an outside of the room;

a pipe chamber formed separately from the heat exchanger chamber in the casing and accommodating a connection portion of the communication pipe and the external connection pipe;

a first refrigerant sensor provided in a lower portion of the heat exchanger chamber and configured to detect the refrigerant;

a refrigerant leakage detection sensor provided in the pipe chamber; and a controller configured to control operation of the indoor unit, wherein the controller is configured to, when determining that a leakage of the refrigerant is occurring based on a result of detection by the refrigerant leakage detection sensor, rotate the air-sending fan, and then stop rotation of the air-sending fan or reduce a rotation speed of the air-sending fan in accordance with a result of detection by the first refrigerant sensor.

2. The indoor unit for an air-conditioning apparatus of claim 1, wherein the refrigerant leakage detection sensor comprises a second refrigerant sensor provided in a lower portion of the pipe chamber and configured to detect the refrigerant, and the controller is configured to determine whether or not the leakage of the refrigerant is occurring based on a result of detection by the second refrigerant sensor.

3. The indoor unit for an air-conditioning apparatus of claim 1, wherein the refrigerant leakage detection sensor comprises a temperature sensor, provided in the pipe chamber and configured to measure a temperature T of the pipe chamber, and the controller is configured to determine whether or not a leakage of the refrigerant is occurring based on the temperature T of the pipe chamber measured by the temperature sensor.

4. The indoor unit for an air-conditioning apparatus of claim 3, wherein, the controller is configured to determine that a leakage of the refrigerant is occurring when a state in which the temperature T of the pipe chamber is equal to or less than a predetermined determination reference temperature Tj continues for a predetermined reference time period Hj, or when an average value Ta of the temperature T of the pipe chamber for a predetermined reference time period Hm is equal to or less than the predetermined determination reference temperature Tj.

5. The indoor unit for an air-conditioning apparatus of claim 3, further comprising a ventilation port formed at a position facing the pipe chamber of the casing to be opposed to the temperature sensor, the ventilation port being configured to allow communication of air between an indoor space of the room and the pipe chamber.

6. The indoor unit for an air-conditioning apparatus of claim 5, further comprising an electrical component unit provided in an upper portion of the pipe chamber and configured to accommodate the controller,
- wherein the temperature sensor is positioned between the electrical component unit and the connection portion in an upper-and-lower direction of the indoor unit.

7. The indoor unit for an air-conditioning apparatus of claim 1, wherein the controller is configured to stop rotation of the air-sending fan or reduce a rotation speed of the air-sending fan when a state in which a refrigerant gas concentration C measured by the first refrigerant sensor is equal to or less than a predetermined determination reference concentration $C_k$ continues for a predetermined reference time period $H_k$.

* * * * *